United States Patent
Liu et al.

(10) Patent No.: US 10,104,669 B2
(45) Date of Patent: Oct. 16, 2018

(54) USER EQUIPMENT OF DEVICE-TO-DEVICE COMMUNICATIONS AND RESOURCE SELECTION METHOD THEREOF

(71) Applicant: Institute For Information Industry, Taipei (TW)

(72) Inventors: Shu-Tsz Liu, Taipei (TW); Yi-Ting Lin, New Taipei (TW); Yi-Hsueh Tsai, New Taipei (TW); Chun-Che Chien, Taipei (TW)

(73) Assignee: Institute For Information Industry, Taipei (TW)

( * ) Notice: Subject to any disclaimer, the term of this patent is extended or adjusted under 35 U.S.C. 154(b) by 134 days.

(21) Appl. No.: 14/933,945

(22) Filed: Nov. 5, 2015

(65) Prior Publication Data

US 2016/0135168 A1 May 12, 2016

Related U.S. Application Data

(60) Provisional application No. 62/076,581, filed on Nov. 7, 2014.

(51) Int. Cl.
*H04W 4/00* (2018.01)
*H04W 72/04* (2009.01)
*H04W 92/18* (2009.01)

(52) U.S. Cl.
CPC .......... *H04W 72/048* (2013.01); *H04W 92/18* (2013.01)

(58) Field of Classification Search
CPC ...... H04W 72/048; H04W 4/00; H04W 92/18
(Continued)

(56) References Cited

U.S. PATENT DOCUMENTS

| 2011/0098052 A1 | 4/2011 | Jung et al. |
| 2014/0094183 A1 | 4/2014 | Gao et al. |
(Continued)

FOREIGN PATENT DOCUMENTS

| CN | 102197669 A | 9/2011 |
| CN | 103731900 A | 4/2014 |
(Continued)

OTHER PUBLICATIONS

Office Action to the corresponding Taiwan Patent Application rendered by the Taiwan Intellectual Property Office (TIPO) dated Oct. 12, 2016, 11 pages (including English translation).

*Primary Examiner* — Sai Ming Chan
(74) *Attorney, Agent, or Firm* — Skaar Ulbrich Macari, P.A.

(57) ABSTRACT

The invention relates to a user equipment of device-to-device communications and a resource selection method thereof. The user equipment includes a resource selection device and a transceiver device. The resource selection device is configured to create a state machine model, which includes an in-coverage state and an out-of-coverage state corresponding to a base station. The resource selection device is also configured to select a corresponding device-to-device communication resource in response to a current state of the user equipment during transferring of the user equipment from the in-coverage state to the out-of-coverage state or from the out-of-coverage state to the in-coverage state. The transceiver device is configured to perform a device-to-device communication with another user equipment according to the corresponding device-to-device communication resource. The resource selection method includes the steps corresponding to the operations of the user equipment.

10 Claims, 13 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2014/0307611 A1 | 10/2014 | Tesanovic et al. | |
| 2014/0335853 A1* | 11/2014 | Sartori | H04W 76/023 |
| | | | 455/426.1 |
| 2015/0264677 A1* | 9/2015 | He | H04W 72/02 |
| | | | 370/312 |

FOREIGN PATENT DOCUMENTS

| | | |
|---|---|---|
| CN | 103747507 A | 4/2014 |
| CN | 104105103 A | 10/2014 |
| WO | 2012159270 A1 | 11/2012 |
| WO | 2014163372 A1 | 10/2014 |

* cited by examiner

USER EQUIPMENT OF DEVICE-TO-DEVICE COMMUNICATIONS AND RESOURCE SELECTION METHOD THEREOF

PRIORITY

This application claims priority to U.S. Provisional Patent Application No. 62/076,581 filed on Nov. 7, 2014, which is hereby incorporated herein by reference in its entirety.

FIELD

The present invention relates to a user equipment (UE) and a resource selection method thereof. More particularly, the present invention relates to a UE of device-to-device (D2D) communications and a resource selection method thereof.

BACKGROUND

With advancement of the wireless broadband networks and mobile communication technologies, users have now been accustomed to use of various mobile devices to deal with their works, social communications, entertainments and so on. For conventional wireless communication systems, data and control signals necessary for wireless communication between mobile devices (or called "user equipments (UEs)") must be processed by a base station and a backhaul core network. However, this kind of communication leads to such problems as congestion of the core network and contention for resources among devices.

To solve the aforesaid problems, another kind of wireless communication mechanism may be adopted among the UEs, i.e., the device-to-device (D2D) communication. In a broad sense, the D2D communication generally refers to that a UE can communicate with a target device directly and both can transmit and receive data with each other directly without the need of a base station. As compared to the conventional communication mechanism where UEs must communicate via a base station, the D2D communication has the advantages of reducing the transmission power, reducing the transmission delay, improving the spatial reuse efficiency and so on.

Conventional D2D communications are achieved by means of Bluetooth, Wireless Fidelity (Wi-Fi), infrared rays, or the like technologies, but these technologies are independent of the base station. Unlike the conventional D2D communication technologies, a new kind of D2D communication is implemented in a communication environment having a base station. For example, in the Long Term Evolution/Long Term Evolution-Advanced specified in the $3^{rd}$ Generation Partnership Project (3GPP), a D2D communication scheme implemented in a communication environment having a base station is being planned. In this plan, the UE can search for neighbor devices rapidly within a wide range by using legally authorized frequency spectrums, and can perform D2D communications under the control and assistance of various base stations.

As described above, the new D2D communication scheme is implemented in a communication environment having a base station, so it must share wireless communication resources with the existing wireless communication systems. Therefore, how to select D2D communication resources suitable for current states of UEs is very important for the UEs. As an example, if there is lack of an appropriate resource selection mechanism, then it is likely that a UE that is to perform a D2D communication would use a same wireless communication resource as another UE within the coverage of a same base station, and this would cause interferences between respective communications of the UEs. As another example, if there is lack of an appropriate resource selection mechanism, then when a UE that is to perform a D2D communication enters into the coverage of a base station, there may be no wireless communication resource available for the UE. As a further example, if there is lack of an appropriate selection mechanism, then when a UE that is to perform a D2D communication leaves the coverage of a base station, there may be no wireless communication resource available for the UE. Because development of the new D2D communication scheme is still at an initial stage, currently there is still no effective solution to the aforesaid problems.

Accordingly, an urgent need exists in the art to provide an effective resource selection mechanism for the new D2D communication scheme.

SUMMARY

The disclosure includes a user equipment (UE) of device-to-device (D2D) communications. The UE comprises a resource selection device and a transceiver device electrically connected to the resource selection device. The resource selection device is configured to create a state machine model that comprises an in-coverage state and an out-of-coverage state corresponding to a base station. The resource selection device is also configured to select a corresponding D2D communication resource in response to a current state of the UE during transferring of the UE from the out-of-coverage state to the in-coverage state or from the in-coverage state to the out-of-coverage state. The transceiver device is configured to perform a D2D communication with another UE according to the corresponding D2D communication resource.

The disclosure also includes a resource selection method of device-to-device (D2D) communications. The resource selection method may be used for a user equipment (UE). The UE may comprise a resource selection device and a transceiver device. The resource selection method comprises the following steps of: creating, by the resource selection device, a state machine model that comprises an in-coverage state and an out-of-coverage state corresponding to a base station; selecting, by the resource selection device, a corresponding D2D communication resource in response to a current state of the UE during transferring of the UE from the out-of-coverage state to the in-coverage state or from the in-coverage state to the out-of-coverage state; and performing, by the transceiver device, a D2D communication with another UE according to the corresponding D2D communication resource.

A UE may create a state machine model and select a corresponding D2D communication resource in response to a current state of the UE. The state machine model may comprise various states (e.g., an in-coverage state and an out-of-coverage state corresponding to any base station, as well as other detailed states comprised therein respectively), and each of the states may correspond to an appropriate D2D communication resource. Especially, the UE can select an appropriate D2D communication resource in response to a current state of the UE at any time during transferring of the UE from the out-of-coverage state to the in-coverage state or from the in-coverage state to the out-of-coverage state.

Based on the aforesaid operations, when a UE that is to perform a D2D communication is located within the coverage of a same base station as another UE (i.e., a current state of the UE), the UE may select a wireless communication resource that will not cause interferences between respective communications of the UEs to perform the D2D communication. When a UE that is to perform a D2D communication enters into the coverage of a base station (i.e., another current state of the UE), the UE may select an appropriate wireless communication resource to perform the D2D communication. The appropriate wireless communication resource may be provided actively by the base station, or be requested by the UE from the base station. When a UE that is to perform a D2D communication leaves the coverage of a base station (i.e., yet another current state of the UE), the UE may release the wireless communication resource that is originally occupied by the UE, and select another wireless communication resource suitable for its current state to perform the D2D communication. Thereby, the present invention indeed provides an effective resource selection mechanism for the new D2D communication scheme.

What described above presents a summary of some aspects of the present invention (including the problem to be solved, the means to solve the problem and the effect of the present invention) to provide a basic understanding of these aspects. However, this is not intended to contemplate all aspects of the present invention. Additionally, what described above is neither intended to identify key or essential elements of any or all aspects of the present invention, nor intended to describe the scope of any or all aspects of the present invention. This summary is provided only to present some concepts of some aspects of the present invention in a simple form and as an introduction to the following detailed description.

Details of the aforesaid aspects and other aspects of the present invention will become more apparent to those skilled in the art upon reviewing the attached drawings and the detailed descriptions hereinafter.

DETAILED DESCRIPTION

Figure 1:
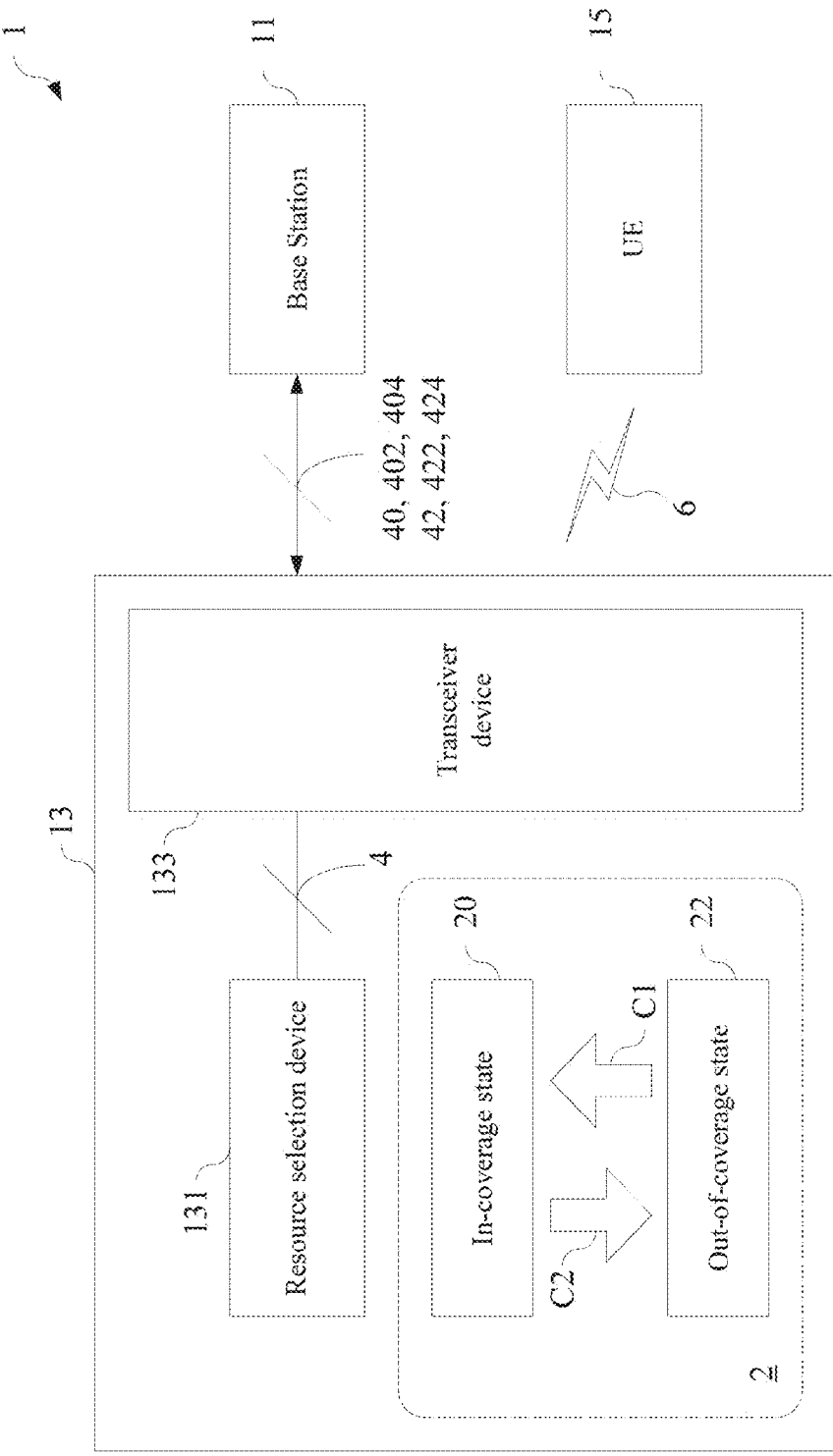
FIG. 1 is a block diagram illustrating an exemplary example of a resource selection system for D2D communications according to one or more embodiments of the present invention.

In the following description, the present invention will be explained with reference to certain example embodiments thereof. However, these example embodiments are not intended to limit the present invention to any specific examples, embodiments, environment, applications, structures, processes or steps described in these example embodiments.

In the attached drawings, elements unrelated to the present invention are omitted from depiction. Also, dimensional relationships among individual elements in the attached drawings are illustrated only for ease of understanding, but not to limit the actual scale. Unless otherwise stated, like reference numerals correspond to like elements in the following descriptions.

An embodiment of the present invention (called "the first embodiment" hereinafter) is a resource selection system for D2D communications. FIG. 1 is a block diagram illustrating an exemplary example of a resource selection system for D2D communications according to one or more embodiments of the present invention. As shown in FIG. 1, the resource selection system 1 may comprise at least one base station 11 (i.e., one or more base stations), at least one UE 13 (i.e., one or more UEs 13) and at least one UE 15 (i.e., one or more UEs 15). Unless otherwise stated, the UE 13 and the UE 15 have the same construction and functions as each other.

The resource selection system 1 may be implemented in various conventional wireless communication systems having base stations, for example but not limited to, LTE, LTE-Advanced, Universal Mobile Telecommunication System (UMTS), or Global System for Mobile Communications (GSM) and so on. Therefore, the resource selection system 1 substantially also has various functions (e.g., the calling service, the short message service, the network service) of conventional wireless communication systems, and the base station 11, the UE 13 and the UE 15 may each comprise corresponding hardware, software, firmware or the like necessary for accomplishing these conventional functions.

The base station 11 may be any of various kinds of base stations, for example but not limited to, macrocells, microcells or picocells. The UE 13 and the UE 15 may each be any of various kinds of electronic devices, for example but not limited to, tablet computers, notebook computers, smartphones or the like.

The base station 11 may comprise a transceiver device (not shown) configured to perform various uplink/downlink communications with the UE 13 and the UE 15 respectively to accomplish transmission and reception of various signals and/or data. The UE 13 may comprise a resource selection device 131 and a transceiver device 133. The resource selection device 131 and the transceiver device 133 may be electrically connected with each other either directly or indirectly, and communicate with each other. Herein, "directly electrically connected" means that the two components are electrically connected without any other intervening component therebetween, and "indirectly electrically connected" means that the two components are electrically connected with an intervening component therebetween. The transceiver device 133 may be configured to perform various uplink/downlink communications with the base station 11 to accomplish transmission and reception of various signals and/or data. The transceiver device 133 may be a transceiver adopted by a UE for two-way communications with a base station in various wireless communication systems. The structure of this kind of transceiver may substantially comprise transceiver components such as an antenna, a modulation circuit and an amplifying circuit.

The base station 11, the UE 13 and the UE 15 may substantially each comprise a computer-related device. The computer-related device may comprise a computing component such as a general-purpose processor or microprocessor, and execute various computations by use of this computing component. The computer-related device may comprise a storage component such as a general-purpose memory and/or storage, and store various data in this storage component. The computer-related device may comprise general-purpose input/output components, and receive data from and output data to the user via the input/output components. The computer-related device may execute corresponding operations described below via the computing component, the storage component, the input/output components or the like according to processes implemented by software, firmware, programs, algorithms or the like. Unless otherwise stated, the following operations of the base station 11, the UE 13 and the UE 15 can all be accomplished by the computer-related device comprised in the base station 11, the UE 13 and the UE 15 respectively.

For example, the resource selection device 131 may be a part of the computer-related device substantially comprised in the UE 13. Therefore, the computer-related device substantially comprised in the UE 13 can accomplish the following operations of the resource selection device 131 via the computing component, the storage component, the input/output components or the like according to processes implemented by software, firmware, programs, algorithms or the like.

As shown in FIG. 1, the resource selection device 131 may be configured to create a state machine model 2 for the UE 13. The state machine model 2 may be configured to represent various states of the UE 13 as well as behaviors of the UE 13 such as transferring between these states and/or activities. After the state machine model 2 has been created, the resource selection device 131 may pre-define a corresponding D2D communication resource 4 according to various states of the state machine model 2. Thus, the resource selection device 131 can select a D2D communication resource 4 suitable for a D2D communication 6 between the UE 13 and the UE 15 in response to different states of the UE 13 at any time.

For example, in this embodiment, the state machine model 2 may comprise, but is not limited to, an in-coverage state 20 and an out-of-coverage state 22 corresponding to the base station 11. The in-coverage state 20 may represent that the UE 13 is located within the coverage of the base station 11, and the out-of-coverage 22 may represent that the UE 13 is located out of the coverage of the base station 11. Optionally, to reflect the actual state of the UE 13 more precisely, the in-coverage state 20 and the out-of-coverage state 22 may each further comprise other detailed states/modes (to be described later).

The resource selection device 13 may select a corresponding D2D communication resource 4 in response to a current state of the UE 13 during transferring of the UE 13 from the out-of-coverage state 22 to the in-coverage state 20 or from the in-coverage state 20 to the out-of-coverage state 22, and the transceiver device 133 may perform a D2D communication 6 with the UE 15 according to the corresponding D2D communication resource 4. In this embodiment, the UE 13 may act as an active role, and the UE 15 may act as a passive role. In other words, the D2D communication resource 4 necessary for the D2D communication 6 between the UE 13 and the UE 15 is actively selected by the UE 13, and the UE 15 just passively accepts the D2D communication resource 4 selected by the UE 13.

When a current state of the UE 13 is the out-of-coverage state 22, the base station 1 is unable to allocate any D2D communication resource 4 to the UE 13, so the UE 13 may perform the D2D communication 6 with the UE 15 according to a predetermined D2D communication resource (not shown). The predetermined D2D communication resource may correspond to the Mode 2 UICC described in the priority basis application of this application. Mode 2 UICC is a specific resource instructed by UICC (Universal Integrated Circuit Card).

Referring to FIG. 1, in the state machine model 2, conditions on which the UE 13 transfers between the in-coverage state 20 and the out-of-coverage state 22 may be set. In detail, if a first condition C1 is satisfied, then the resource selection device 131 can determine that a current state of the UE 13 is the in-coverage state 20 (e.g., transferring from the out-of-coverage 22 to the in-coverage state 20); and if a second condition C2 is satisfied, then the resource selection device 131 can determine that a current state of the UE 13 is the out-of-coverage state 22 (e.g., transferring from the in-coverage state 20 to the out-of-coverage state 22). For example (but not for limitation), in the state machine model 2, the first condition C1 may be that the UE 13 complies with a cell selection criterion and a system information block (SIB) is decoded by the UE, and the second condition C2 may be that the UE 13 does not comply with the cell selection criterion.

The cell selection criterion described above may also be termed the S-Criterion, and may be used to determine whether a base station is a suitable base station. The basic principle of the cell selection criterion is as follows: if the strength of a signal received by a UE from a base station is higher than a predetermined threshold, then the UE selects the base station to provide services for the UE. For details of the S-Criterion, the cell selection criterion described in Section 5.2.3.2 of the specification Version 36.304 V12.5.0 formulated by 3GPP may be incorporated herein for reference. The resource selection resource 131 can determine whether a signal of sufficient strength is received by the UE 13 from the base station 11 according to the cell selection criterion described above.

In the technical specification formulated by 3GPP, a base station may inform a UE of various pieces of system information via a system information message that comprises the SIB described above. In the technical specification formulated by 3GPP, a system information message may comprise a plurality of SIBs, and each SIB may comprise different pieces of system information. For example, the first SIB (i.e., SIB 1) comprises information related to the accessing base station, the cell selection information, the scheduling information and so on; and the second SIB (i.e., SIB 2) comprises access restriction information, semi-static common channel configuration, uplink frequency information and so on. The specification and description of 3GPP are incorporated herein for reference.

It may be that only after all SIBs have been decoded by the UE 13, the resource selection device 131 determines that the UE 13 can normally communicate with the base station 11. Alternatively, the resource selection device 131 determines that the UE 13 can normally communicate with the base station 11 even when only one or a part of the SIBs have been decoded by the UE 13 (e.g., when only the first SIB has been decoded). If the necessary system information can be decoded by the UE 13 from the system information message transmitted from the base station 11, it means that the UE 13 can communicate with the base station 11.

According to the cell selection criterion described above and successful decoding of the system information message, the resource selection device 131 can set the conditions on which the UE 13 transfers between the in-coverage state 20 and the out-of-coverage state 22. In detail, if the UE 13 can receive a signal of sufficient strength from the base station 11 and can decode the system information message from the system information message (i.e., the first condition C1 is satisfied), then the resource selection device 131 can determine that a current state of the UE 13 is the in-coverage state 20 (e.g., transferring from the out-of-coverage 22 to the in-coverage state 20). On the other hand, if the UE 13 fails to receive a signal of sufficient strength from the base station 11 (i.e., the second condition C2 is satisfied), then the resource selection device 131 can determine that the current state of the UE 13 is the out-of-coverage state 22 (e.g., transferring from the in-coverage state 20 to the out-of-coverage state 22).

Figure 2A:
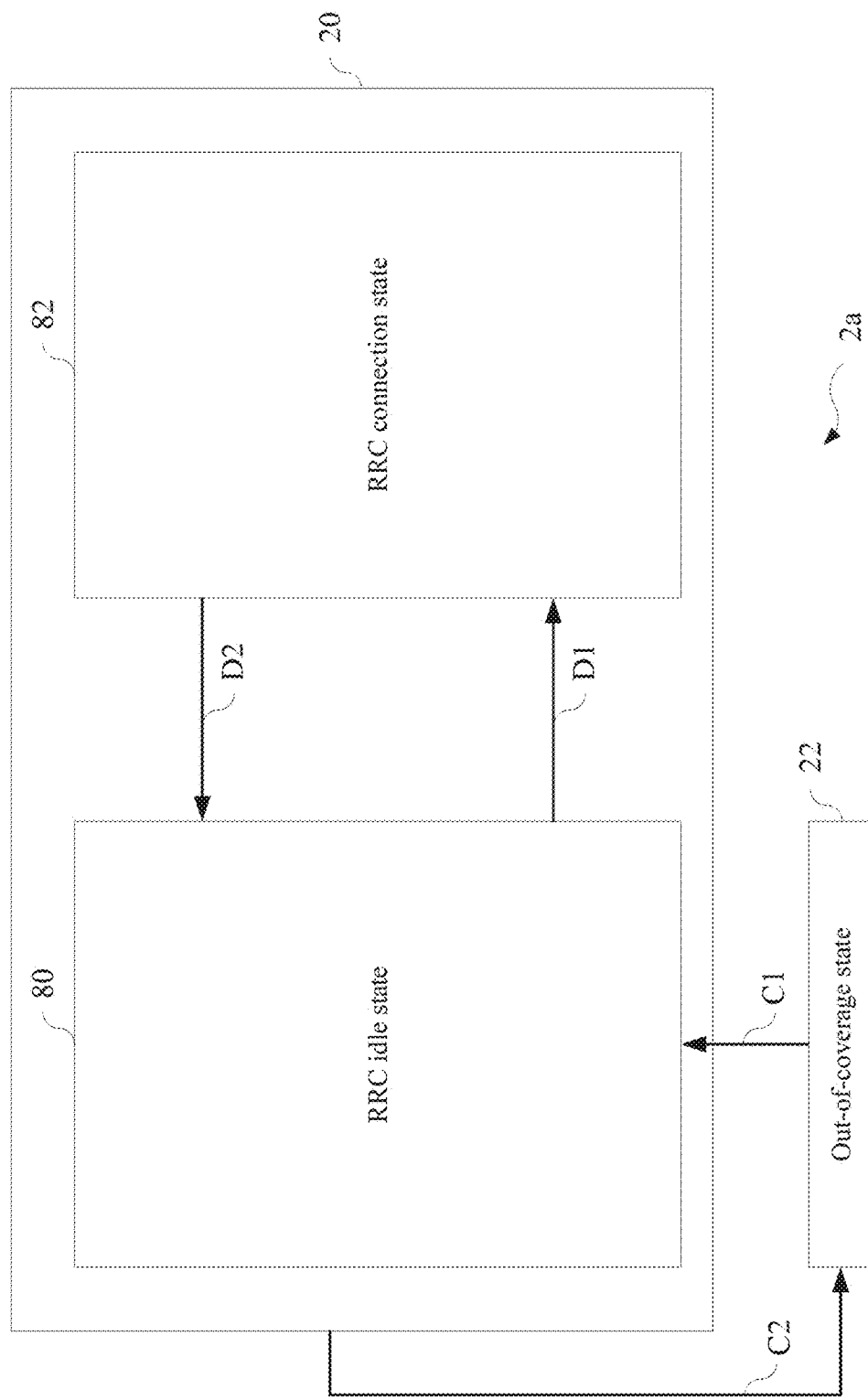
FIG. 2A is a schematic view illustrating an exemplary example of a state machine model corresponding to a UE according to one or more embodiments of the present invention.
Figure 2B:
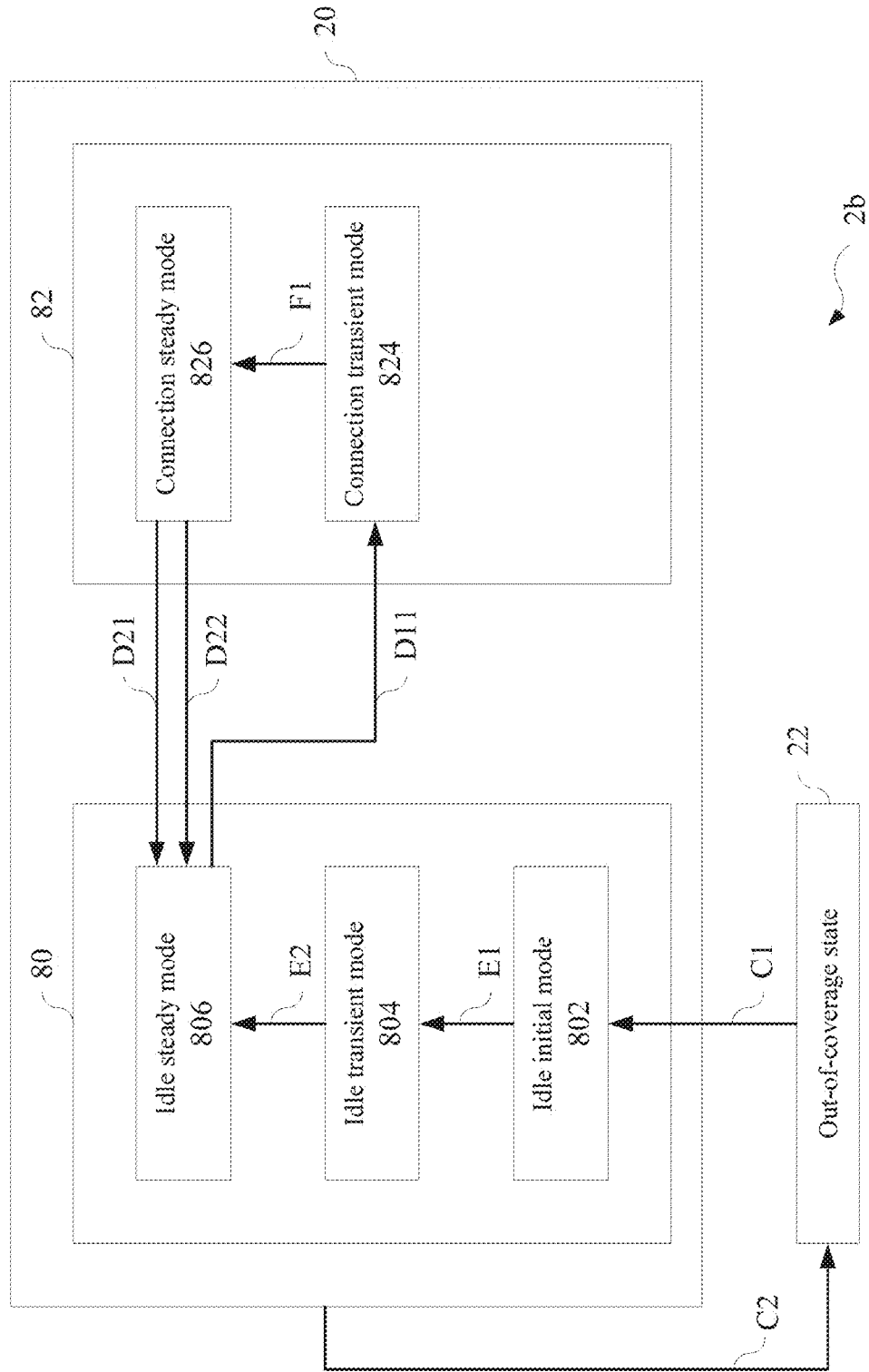
FIG. 2B is a schematic view illustrating an exemplary example of another state machine model corresponding to the UE according to one or more embodiments of the present invention.
Figure 2C:
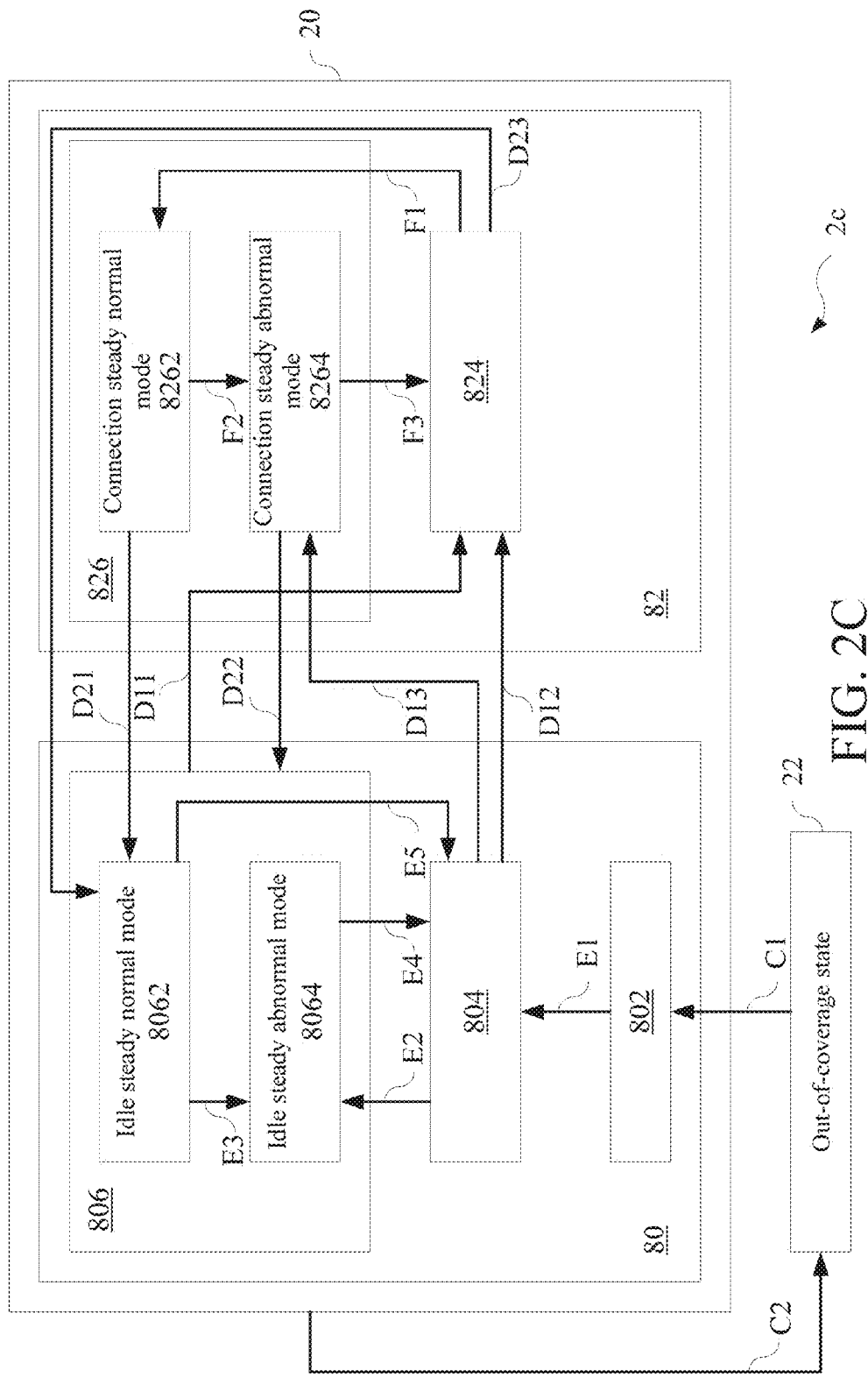
FIG. 2C is a schematic view illustrating an exemplary example of a further state machine model corresponding to the UE according to one or more embodiments of the present invention.

Hereinafter, different implementations of the state machine model 2 will be further described by taking FIG. 2A, FIG. 2B and FIG. 2C as exemplary examples; however, these exemplary examples are not intended to limit the present invention. FIG. 2A is a schematic view illustrating an exemplary example of a state machine model 2a corresponding to the UE 13 according to one or more embodiments of the present invention. FIG. 2B is a schematic view illustrating an exemplary example of another state machine model 2b corresponding to the UE 13 according to one or more embodiments of the present invention. FIG. 2C is a schematic view illustrating an exemplary example of a further state machine model 2c corresponding to the UE 13 according to one or more embodiments of the present invention.

Referring to FIG. 1 and FIG. 2A, the state machine model 2a may comprise an in-coverage state 20 and an out-of-coverage state 22, and the in-coverage state 20 further comprises a radio resource control (RRC) idle state 80 and an RRC connection state 82. The RRC idle state 80 may represent that the UE 13 is located within the coverage of the UE 11 and an RRC connection between the UE 13 and the base station 11 is in an idle state. The RRC connection state 82 may represent that the UE 13 is located within the coverage of the base station 11 and an RRC connection between the UE 13 and the base station 11 is in an active state.

In the state machine model 2a, after determining that the UE 13 is located within the coverage of the base station 11 (i.e., determining that a current state of the UE 13 is the in-coverage state 20), the resource selection device 131 may further determine whether an RRC connection between the UE 13 and the base station 11 is idle or active (i.e., determine whether the current state of the UE 13 is the RRC idle state 80 or the RRC connection state 82). If it is determined that the current state of the UE 13 is the RRC idle state 80, then the resource selection device 131 may select an idle state resource 40 as the corresponding D2D communication resource 4; and if it is determined that the current state of the UE 13 is the RRC connection state 82, then the resource selection device 131 may select a connection state resource 42 as the corresponding D2D communication resource 4. Preferably, the idle state resource 40 may be different from the connection state resource 42. However, depending on actual resources that can be used by the base station 11, the idle state resource 40 and the connection state resource 42 may also be the same or substantially the same as each other. Additionally, the idle state resource 40 and the connection state resource 42 may be resources actively instructed by the base station 11 (e.g., through broadcasting), or may be resources instructed by the base station 11 in response to a request from the UE 13.

As compared to the state machine model 2, the in-coverage state 20 of the state machine model 2a further comprises the two detailed states, i.e., the RRC idle state 80 and the RRC connection state 82, so the resource selection device 131 can determine the actual state of the UE 13 more precisely. Thus, the resource selection device 131 can select a more suitable resource as the corresponding D2D communication resource 4.

Referring to FIG. 2A, as compared to the state machine model 2, the resource selection device 131 may further set the conditions on which the UE 13 transfers between the RRC idle state 80 and the RRC connection state 82 in the state machine model 2a. In detail, if a condition D1 is satisfied, then the resource selection device 131 can determine that a current state of the UE 13 is the RRC connection state 82 (e.g., transferring from the RRC idle state 80 to the RRC connection state 82); and if a condition D2 is satisfied, then the resource selection device 131 can determine that a current state of the UE 13 is the RRC idle state 80 (e.g., transferring from the RRC connection state 82 to the RRC idle state 80). For example (but not for limitation), in the state machine model 2a, the condition D1 may be that an RRC connection is created successfully between the UE 13 and the base station 11, and the condition D2 may be that an RRC connection between the UE 13 and the base station 11 becomes idle.

Referring to FIG. 1 and FIG. 2B, as compared to the state machine model 2a, the RRC idle state 80 in the state machine model 2b further comprises an idle initial mode 802, an idle transient mode 804 and an idle steady mode 806, and the RRC connection state 82 in the state machine model 2b further comprises a connection transient mode 824 and a connection steady mode 826. The idle initial mode 802 may refer to a state in which the UE 13 just enters into the coverage of the base station 11 and an RCC connection between the UE 13 and the base station 11 is being initialized (or being setting). The idle transient mode 804 may refer to a state in which initialization of the RRC connection has been completed but whether the RRC connection is idle or active has not been determined. The idle steady mode 806 may refer to a state in which the RRC connection is idle. The connection transient mode 824 may refer to a status in which the RRC connection has been created but is not active. The connection steady mode 826 may refer to a state in which the RRC connection is active.

In the state machine model 2b, the resource selection device 131 may also determine to which one of an initialization stage, a transient stage and a steady stage an RRC connection between the UE 13 and the base station 11 corresponds (i.e., determine which one of the initial mode 802, the idle transient mode 804 and the idle steady mode 806 is the current state of the UE 13) at the same time when determining whether the RRC connection is idle. Similarly, the resource selection device 131 may also determine to which one of a transient stage and a steady stage the RCC connection between the UE 13 and the base station 11 corresponds (i.e., determine which one of the connection transient mode 824 and the connection steady mode 826 is the current state of the UE 13) at the same time when determining whether the RRC connection is active.

The idle initial mode 802, the idle transient mode 804, the idle steady mode 806, the connection transient mode 824 and the connection steady mode 826 may correspond to different D2D communication resources 4 respectively. For example, when it is determined that the current state of the UE 13 is the idle steady mode 806, the resource selection device 131 may select the idle state resource 40 as the corresponding D2D communication resource 4; and when it is determined that the current state of the UE 13 is the connection steady mode 826, the resource selection device 131 may select the connection state resource 42 as the corresponding D2D communication resource 4. Preferably, because the idle initial mode 802, the idle transient mode 804 and the connection transient mode 824 are transition states, the resource selection device 131 may not select the idle state resource 40 instructed by the base station 11 as the corresponding D2D communication resource 4 when it is determined that a current state of the UE 13 is the idle initial mode 802 or the idle transient mode 804; and may not select the connection state resource 42 instructed by the base station 11 as the corresponding D2D communication resource 4 when it is determined that a current state of the UE 13 is the connection transient mode 824. When it is determined that a current state of the UE 13 is any of the idle initial mode 802, the idle transient mode 804 and the connection transient mode 824, the resource selection device 131 may select other resources (e.g., a predetermined resource or other resources instructed by the base station) as the corresponding D2D communication resource 4.

As compared to the state machine model 2a, the RRC idle state 80 of the state machine model 2b further comprises the three detailed states, i.e., the idle initial mode 802, the idle transient mode 804 and the idle steady mode 806, and the RRC connection states 82 of the state machine model 2b further comprises the two detailed states, i.e., the connection transient mode 824 and the connection steady mode 826. Thus, the resource selection device 131 can determine the actual state of the UE 13 more precisely. Thus, the resource selection device 131 can select a more suitable resource as the corresponding D2D communication resource 4.

Referring to FIG. 2B, as compared to the state machine model 2a, the resource selection device 131 may further set conditions on which the UE 13 transfers between the idle initial mode 802, the idle transient mode 804, the idle steady mode 806, the connection transient mode 824 and the connection steady mode 826 in the state machine model 2b. In detail, if the condition C1 is satisfied, then the resource selection device 131 may determine that a current state of the UE 13 is the idle initial mode 802 (e.g., transferring from the out-of-coverage state 22 to the idle initial mode 802); if a condition E1 is satisfied, then the resource selection device 131 may determine that a current state of the UE 13 is the idle transient mode 804 (e.g., transferring from the idle initial mode 802 to the idle transient mode 804); if a condition E2 is satisfied, then the resource selection device 131 may determine that a current state of the UE 13 is the idle steady mode 806 (e.g., transferring from the idle transient mode 804 to the idle steady mode 806); if a condition D11 is satisfied, then the resource selection device 131 may determine that a current state of the UE 13 is the connection transient mode 824 (e.g., transferring from the idle steady mode 806 to the connection transient mode 824); if a condition D21 or a condition D22 is satisfied, then the resource selection device 131 may determine that a current state of the UE 13 is the idle steady mode 806 (e.g., transferring from the connection steady mode 826 to the idle steady mode 806); and if a condition F1 is satisfied, then the resource selection device 131 may determine that a current state of the UE 13 is the connection steady mode 826 (e.g., transferring from the connection transient mode 824 to the connection steady mode 826).

For example (but not for limitation), in the state machine model 2b, the condition C1 may be that the UE 13 complies with a cell selection criterion and an SIB is decoded by the UE 13, as described above; the condition E1 may be that an RRC connection between the UE 13 and the base station 11 is being initialized; the condition E2 may be that creation of an RRC connection between the UE 13 and the base station 11 fails; the condition D11 may be that creation of an RRC connection between the UE 13 and the base station 11 is successful; the condition D21 may be the same as the condition D2, i.e., may be that an RRC connection between the UE 13 and the base station 11 becomes idle; the condition D22 may be that a timer fails; and the condition F1 may be that the base station 11 permits the UE 13 to perform the D2D communication 6 with the UE 15. In the condition D22, the timer may be but is not limited to the timer numbered 311 (i.e., T311) specified in LTE. T311 may be activated when an RRC connection is re-created, and ended when a suitable base station has been selected. The specification on T311 in LTE and descriptions thereof may be incorporated herein for reference.

Referring to FIG. 1 and FIG. 2C, as compared to the state machine model 2b, the idle steady mode 806 of the state machine model 2c further comprises an idle steady normal mode 8062 and an idle steady abnormal mode 8064, and the connection steady mode 826 further comprises a connection steady normal mode 8262 and a connection steady abnormal mode 8264. The idle steady normal mode 8062 may represent that an RCC connection between the UE 13 and the base station 11 is in a normal idle state, and the idle steady abnormal mode 8064 may represent that the RRC connection is an idle state caused by an abnormal condition of the radio connection. The connection steady normal mode 8262 may represent that an RRC connection between the UE 13 and the base station 11 is in a normal active mode, and the connection steady abnormal mode 8264 may represent that the RRC connection is in an abnormal active state.

In the state machine model 2c, the resource selection device 131 may further determine whether an RRC connection between the UE 13 and the base station 11 is in a normal idle state or an abnormal idle state (i.e., determine whether a current state of the UE 13 is the idle steady normal mode 8062 or the idle steady abnormal mode 8064) when it is determined that the RRC connection is idle. Similarly, the resource selection device 131 may further determine whether an RRC connection between the UE 13 and the base station 11 is in a normal active state or an abnormal active state (i.e., determine whether a current state of the UE 13 is the connection steady normal mode 8262 or the connection steady abnormal mode 8264) when it is determined that the RRC connection is active.

The idle steady normal mode 8062, the idle steady abnormal mode 8064, the connection steady normal mode 8262 and the connection steady abnormal mode 8264 may correspond to different D2D communication resources 4 respectively. For example, the idle state resource 40 may comprise a first idle state resource 402 and a second idle state resource 404, and the connection state resource 42 may comprise a first connection state resource 422 and a second connection state resource 424. The first idle state resource 402 may correspond to Mode 2 RRC described in the priority basis application. Mode 2 RRC refers to resources used for a general state that are instructed through RRC by the base station 11 (e.g., putting the resources into an SIB for broadcasting). The second idle state resource 404 and the second connection state resource 424 may correspond to Mode 2 FB described in the priority basis application respectively. Mode 2 FB refers to resources used for fallback (FB) under abnormal radio connection conditions that are instructed through RRC by the base station 11. The first connection state resource 422 may correspond to Mode 1/Mode 2 RRC described in the priority basis application. Mode 1/Mode 2 RRC refers to resources used for a general state that are instructed through RRC (e.g., putting the resources in an SIB for broadcasting) or through dedicated signaling by the base station 11.

When it is determined that a current state of the UE 13 is the idle steady normal mode 8062, the resource selection device 131 may select the first idle state resource 402 as the corresponding D2D communication resource 4; when it is determined that a current state of the UE 13 is the idle steady abnormal mode 8064, the resource selection device 131 may select the second idle state resource 404 as the corresponding D2D communication resource 4; when it is determined that a current state of the UE 13 is the connection steady normal mode 8262, the resource selection device 131 may select the first connection state resource 422 as the corresponding D2D communication resource 4; and when it is determined that a current state of the UE 13 is the connection steady abnormal mode 8264, the resource selection device 131 may select the second connection state resource 424 as the corresponding D2D communication resource 4.

As described above, because the idle initial mode 802, the idle transient mode 804 and the connection transient mode 824 are transition states, preferably the resource selection device 131 may not select the idle state resource 40 instructed by the base station 11 as the corresponding D2D communication resource 4 when it is determined that a current state of the UE 13 is the idle initial mode 802 or the idle transient mode 804; and may not select the connection state resource 42 instructed by the base station 11 as the corresponding D2D communication resource 4 when it is determined that a current state of the UE 13 is the connection transient mode 824. When it is determined that a current state of the UE 13 is any of the idle initial mode 802, the idle transient mode 804 and the connection transient mode 824, the resource selection device 131 may select other resources (e.g., a predetermined resource or other resources instructed by the base station) as the corresponding D2D communication resource 4.

As compared to the state machine model 2b, the idle steady mode 806 of the state machine model 2c further comprises the two detailed states, i.e., the idle steady normal mode 8062 and the idle steady abnormal mode 8064, and the connection steady mode 826 of the state machine model 2c further comprises the two detailed states, i.e., the connection steady normal mode 8262 and the connection steady abnormal mode 824. Thus, the resource selection device 131 can determine the actual state of the UE 13 more precisely. Thus, the resource selection device 131 can select a suitable resource as the corresponding D2D communication resource 4.

Referring to FIG. 2C, as compared to the state machine model 2b, the resource selection device 131 of the state machine model 2c may further set conditions on which the UE 13 transfers between the idle initial mode 802, the idle transient mode 804, the idle steady normal mode 8062, the idle steady abnormal mode 8064, the connection transient mode 824, the connection steady normal mode 8262 and the connection steady abnormal mode 8264 in the state machine model 2b. In detail, if the condition C1 is satisfied, then the resource selection device 131 may determine that a current state of the UE 13 is the idle initial mode 802 (e.g., transferring from the out-of-coverage state 22 to the idle initial mode 802); if a condition E1 is satisfied, then the resource selection device 131 may determine that a current state of the UE 13 is the idle transient mode 804 (e.g., transferring from the idle initial mode 802 to the idle transient mode 804); if a condition E2 is satisfied, then the resource selection device 131 may determine that a current state of the UE 13 is the idle steady normal mode 8064 (e.g., transferring from the idle transient mode 804 to the idle steady abnormal mode 8064); if a condition E3 is satisfied, then the resource selection device 131 may determine that a current state of the UE 13 is the idle steady abnormal mode 8064 (e.g., transferring from the idle steady normal mode 8062 to the idle steady abnormal mode 8064); if a condition E4 is satisfied, then the resource selection device 131 may determine that a current state of the UE 13 is the idle transient mode 804 (e.g., transferring from the idle steady abnormal mode 8062 to the idle transient mode 804); if a condition E5 is satisfied, then the resource selection device 131 may determine that a current state of the UE 13 is the idle transient mode 804 (e.g., transferring from the idle steady normal mode 8062 to the idle transient mode 804); if a condition D11 is satisfied, then the resource selection device 131 may determine that a current state of the UE 13 is the connection transient mode 824 (e.g., transferring from the idle steady mode 806 to the connection transient mode 824); if a condition D12 is satisfied, then the resource selection device 131 may determine that a current state of the UE 13 is the connection transient mode 824 (e.g., transferring from the idle transient mode 804 to the connection transient mode 824); if a condition D13 is satisfied, then the resource selection device 131 may determine that a current state of the UE 13 is the connection steady abnormal mode 8264 (e.g., transferring from the idle transient mode 804 to the connection steady abnormal mode 8264); if a condition D21 is satisfied, then the resource selection device 131 may determine that a current state of the UE 13 is the idle steady normal mode 8062 (e.g., transferring from the connection steady normal mode 8262 to the idle steady normal mode 8062); if a condition D22 is satisfied, then the resource selection device 131 may determine that a current state of the UE 13 is the idle steady mode 806 (e.g., transferring from the connection steady abnormal mode 8264 to the idle steady mode 806); if a condition D23 is satisfied, then the resource selection device 131 may determine that a current state of the UE 13 is the idle steady normal mode 8062 (e.g., transferring from the connection transient mode 824 to the idle steady normal mode 8062); if a condition F1 is satisfied, then the resource selection device 131 may determine that a current state of the UE 13 is the connection steady normal mode 8262 (e.g., transferring from the connection transient mode 824 to the connection steady normal mode 8262); if a condition F2 is satisfied, then the resource selection device 131 may determine that a current state of the UE 13 is the connection steady abnormal mode 8264 (e.g., transferring from the connection steady normal mode 8262 to the connection steady abnormal mode 8264); and if a condition F3 is satisfied, then the resource selection device 131 may determine that a current state of the UE 13 is the connection transient mode 824 (e.g., transferring from the connection steady abnormal mode 8264 to the connection transient mode 824).

For example (but not for limitation), the condition E3 may be that re-creation of an RRC connection between the UE 13 and the base station 11 is failure; the conditions E4, E5 may be that an RRC connection between the UE 13 and the base station 11 is re-initialized; the condition D12 may be that creation of an RRC connection between the UE 13 and the base station 11 is successful; the condition D13 may be that a timer fails; the condition D23 may be the same as the condition D2, i.e., may be that an RRC connection between the UE 13 and the base station 11 becomes idle; the condition F2 may be that another timer is activated; and the condition F3 may be that re-creation of an RRC connection between the UE 13 and the base station 11 is successful.

In the condition D13, the timer may be but is not limited to the timer numbered 300 (i.e., T300) specified in LTE. T300 may be activated when an RRC connection request is transmitted and ended when an RRC connection setting is received. In the condition F2, the timer may be but is not limited to the timer numbered 310 (i.e., T310) specified in LTE. T310 may be activated when a problem in the physical layer (e.g., loss of synchronization) is detected by a UE and ended when a synchronization instruction is received from a lower level by the UE. Specifications on T300 and T310 in LTE and descriptions thereof may be incorporated herein for reference. Because the conditions C1, E1, E2, D11, D21, D22, F1 in the state machine model 2c are the same as the conditions C1, E1, E2, D11, D21, D22, F1 in the state machine model 2b described above, they will not be further described herein.

Figure 3A:
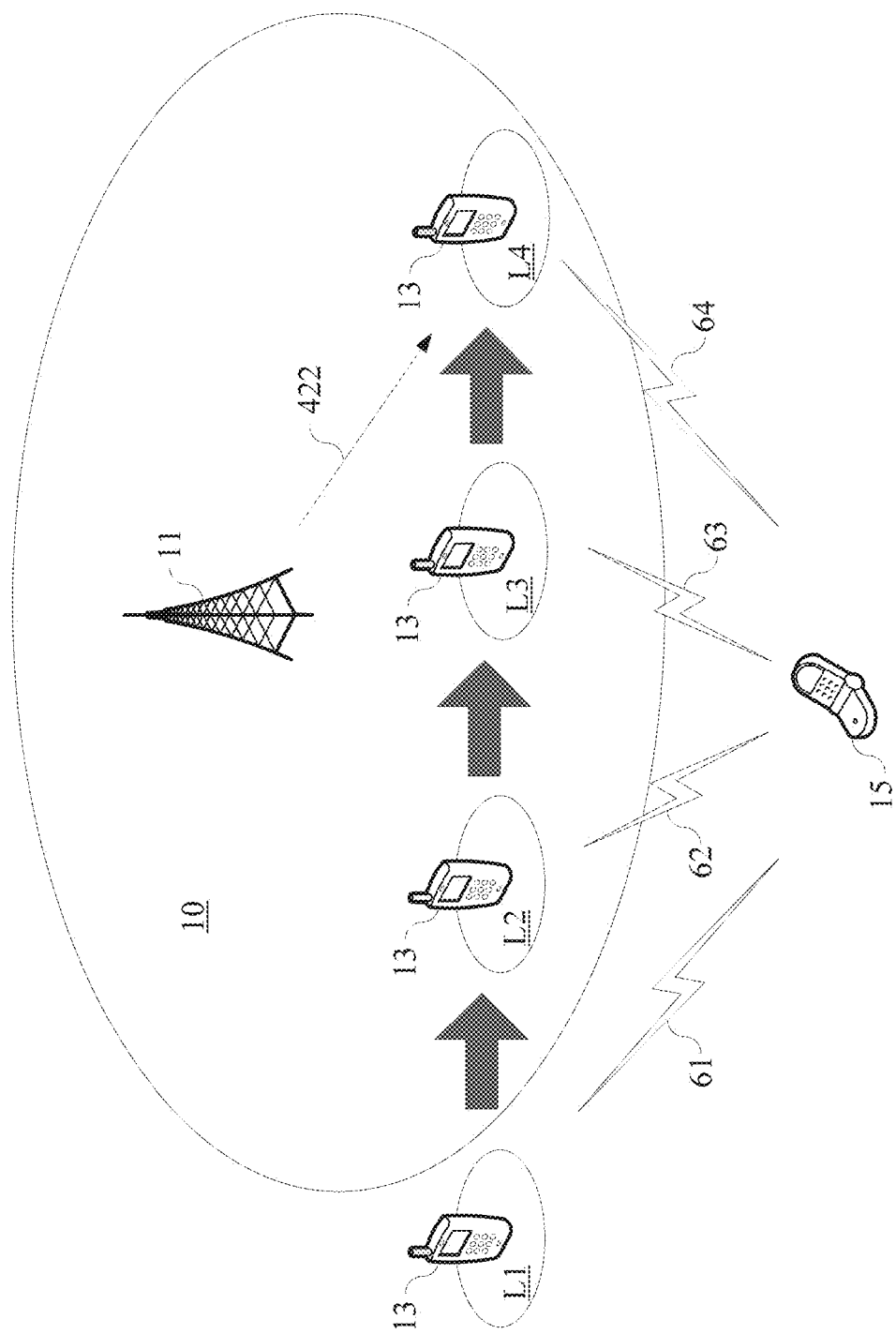
FIGS. 3A-3B are schematic views illustrating an exemplary example of an overall operation of the resource selection system shown in FIG. 1 according to one or more embodiments of the present invention.
Figure 3B:
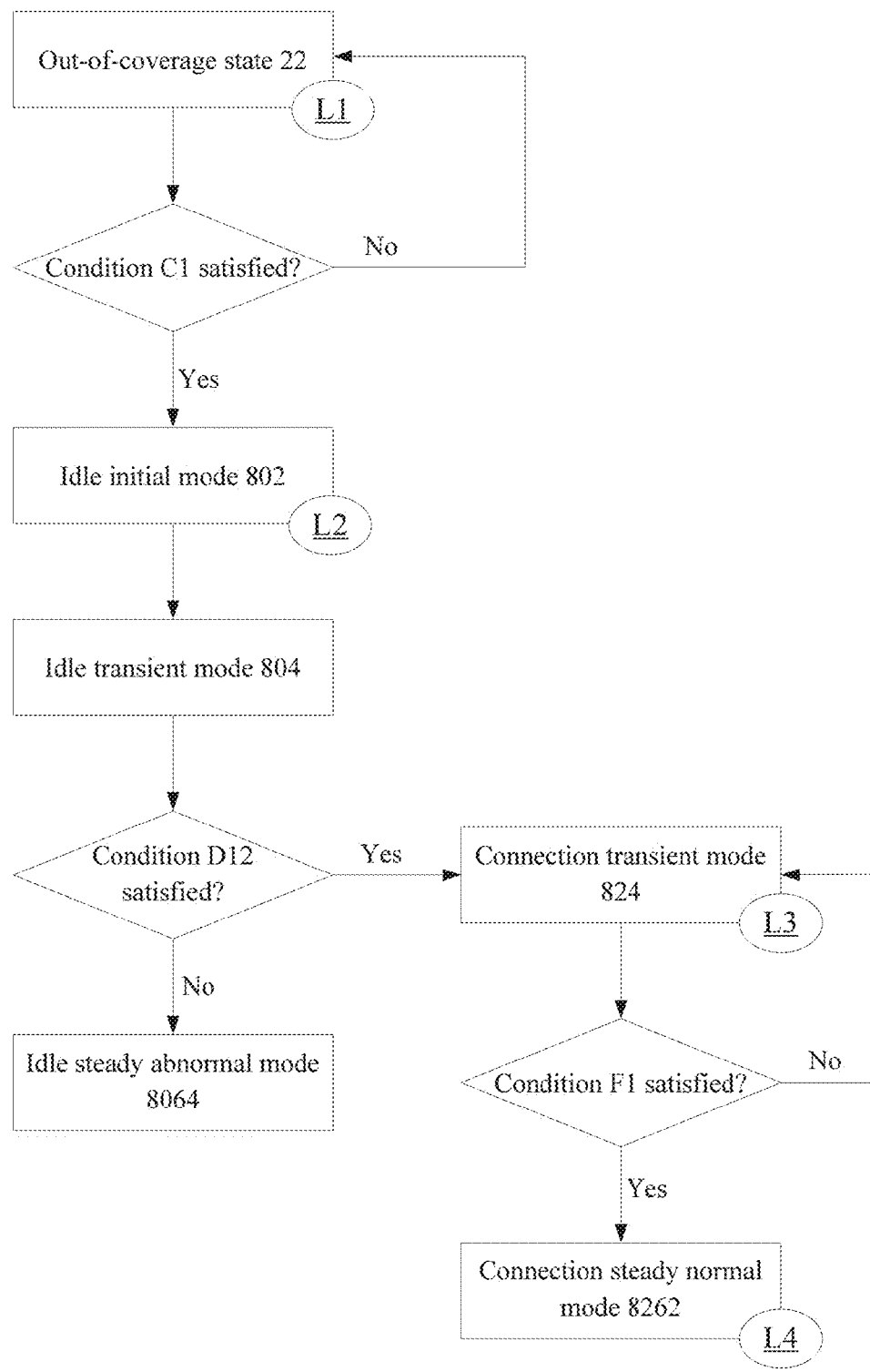
Figure 4A:
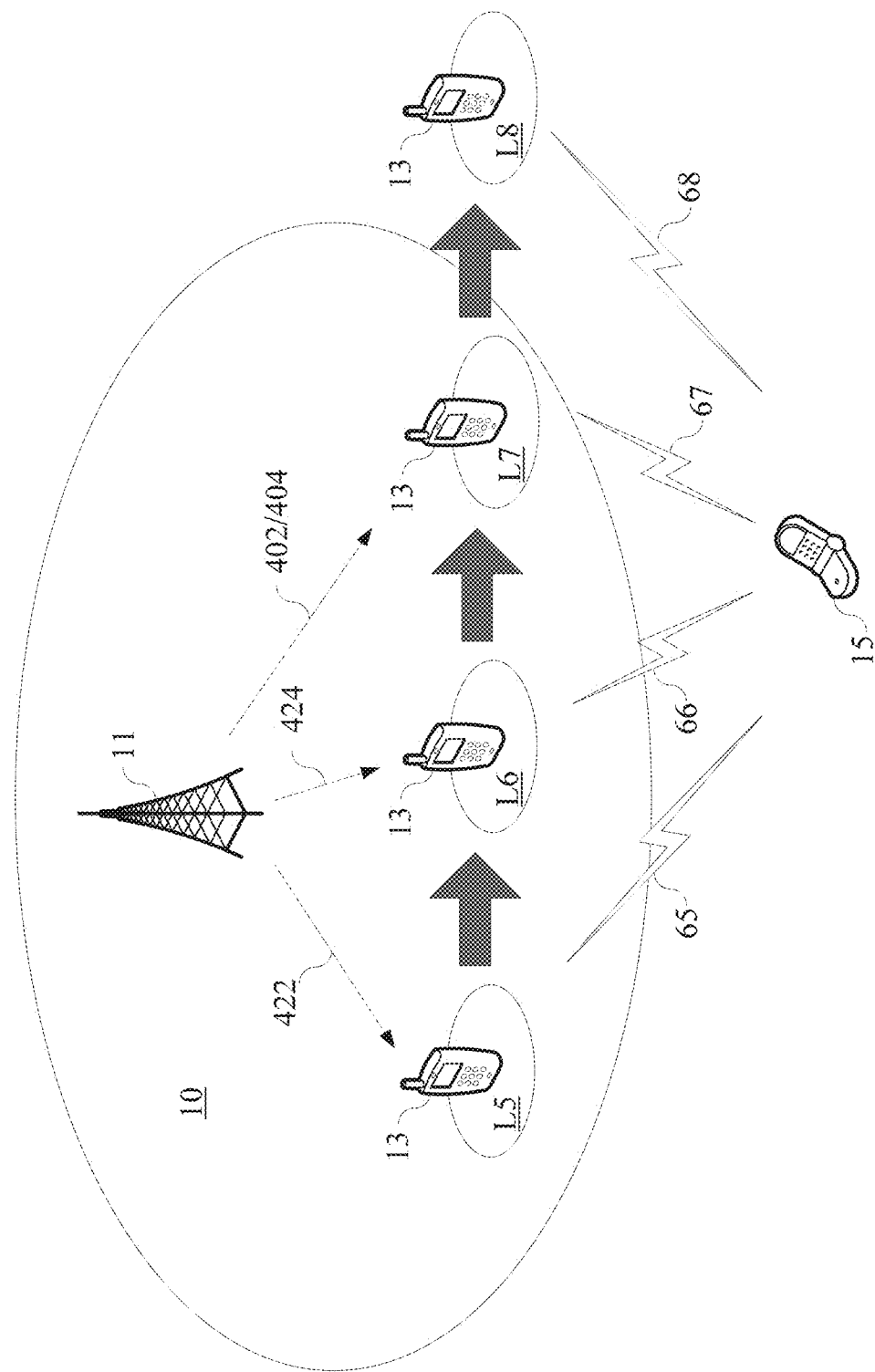
FIGS. 4A-4B are schematic views illustrating an exemplary example of another overall operation of the resource selection system shown in FIG. 1 according to one or more embodiments of the present invention.
Figure 4B:
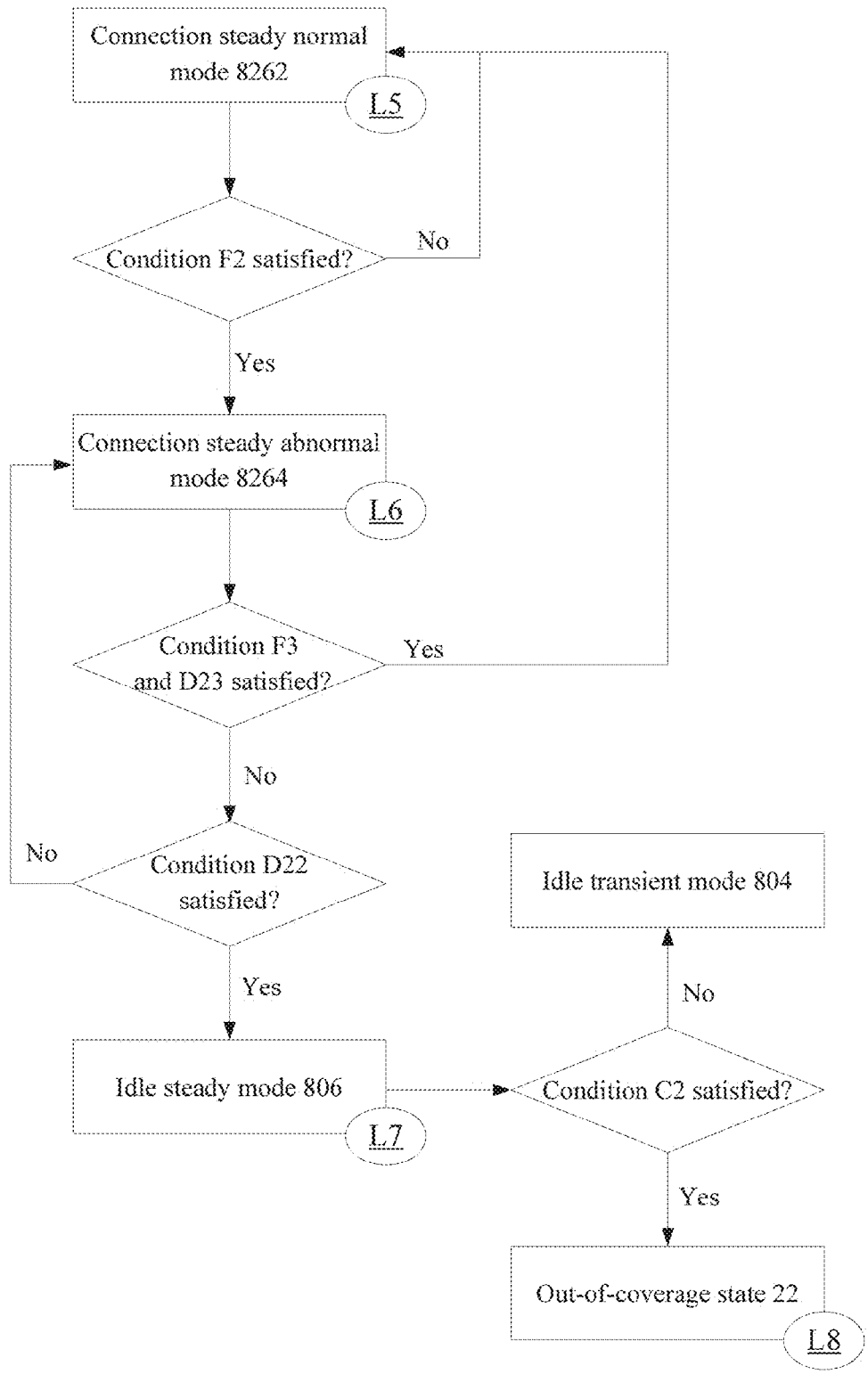
Figure 5A:
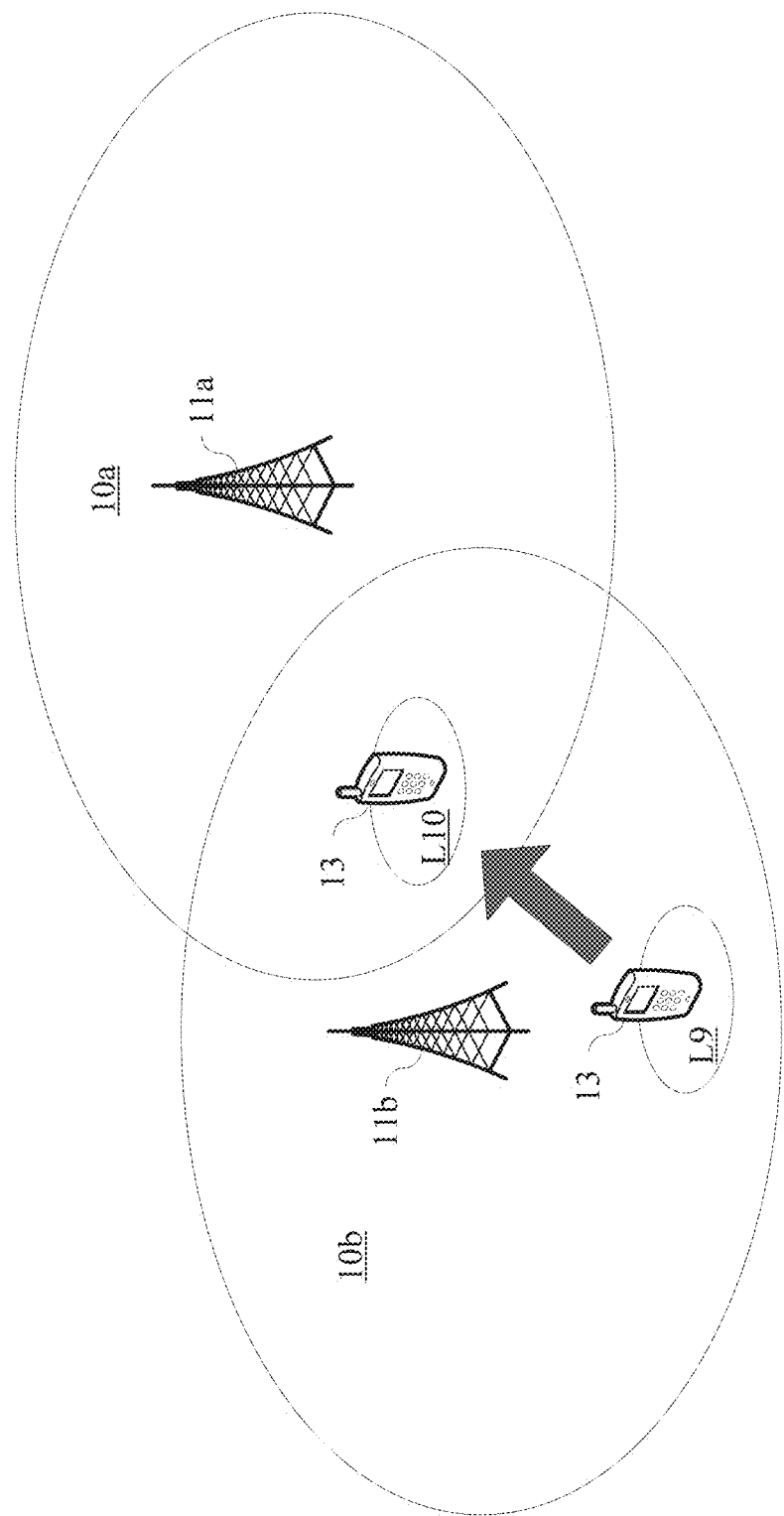
FIGS. 5A-5B are schematic views illustrating an exemplary example of yet another overall operation of the resource selection system shown in FIG. 1 according to one or more embodiments of the present invention.
Figure 5B:
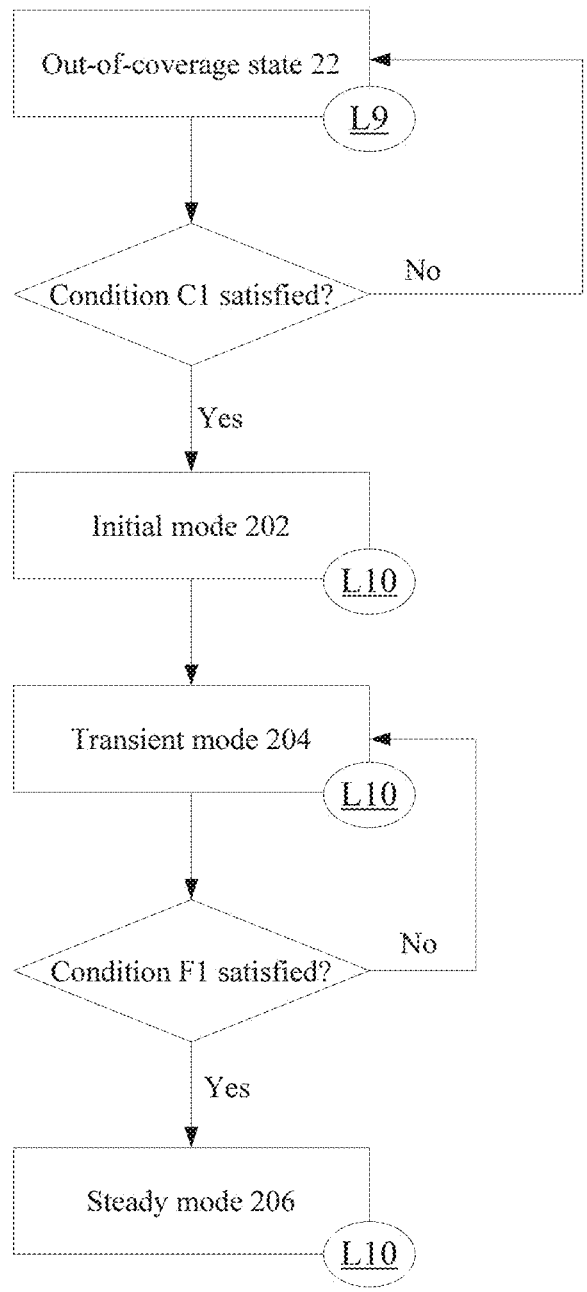
Figure 6A:
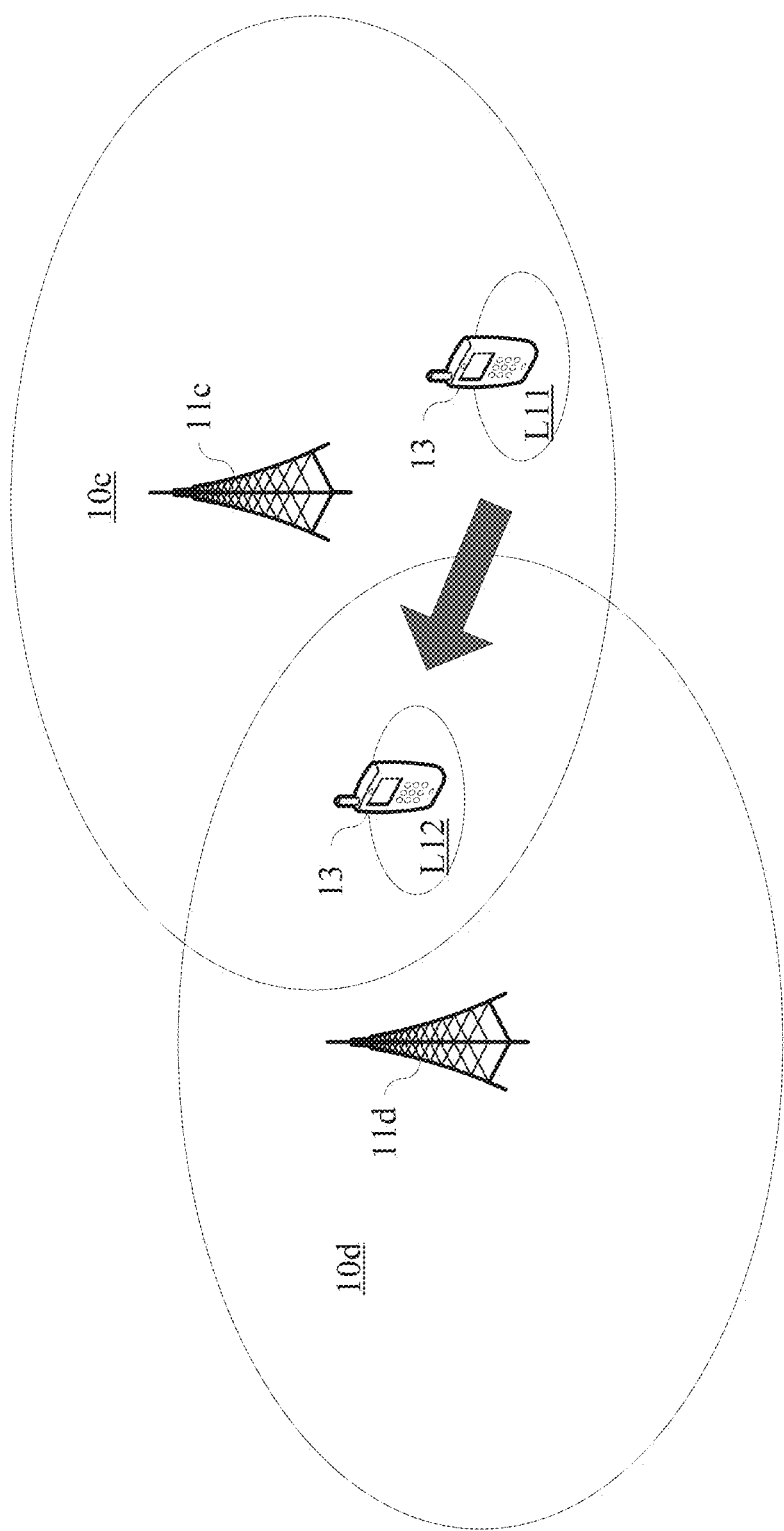
FIGS. 6A-6B are schematic views illustrating an exemplary example of still another overall operation of the resource selection system shown in FIG. 1 according to one or more embodiments of the present invention.
Figure 6B:
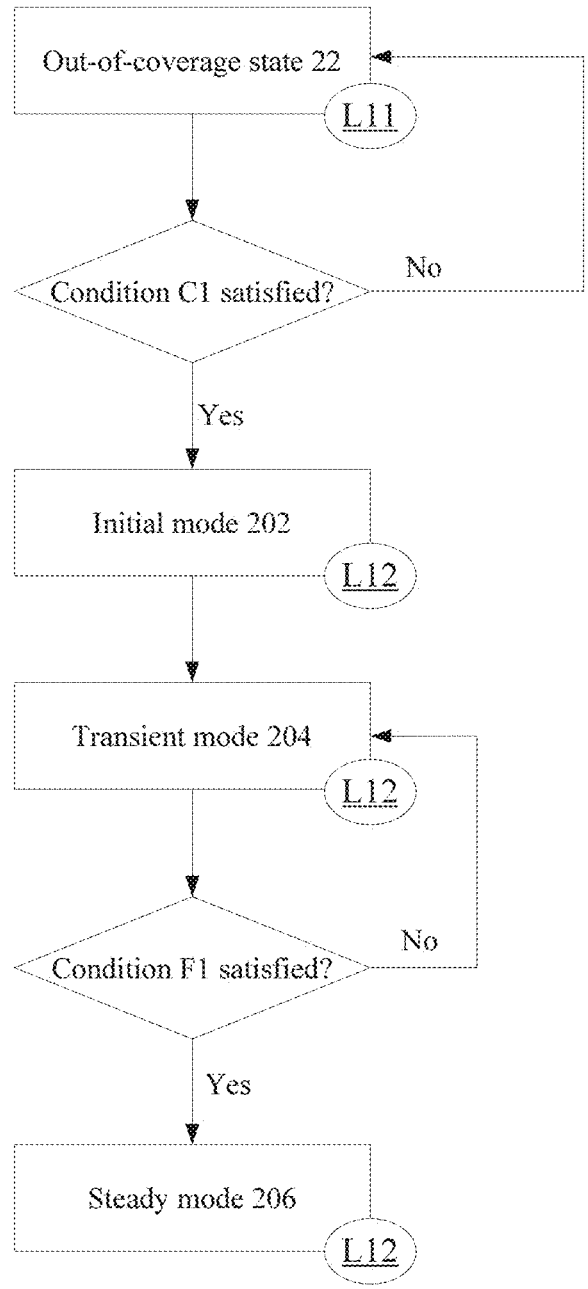

Hereinafter, various overall operations of the resource selection system 1 will be further described by taking FIGS. 3A~3B, FIGS. 4A~4B, FIGS. 5A~5B and FIGS. 6A~6B as exemplary examples; however, these exemplary examples are provided not for limitation purpose. FIGS. 3A~3B are schematic views illustrating an exemplary example of an overall operation of the resource selection system shown in FIG. 1 according to one or more embodiments of the present invention. FIGS. 4A~4B are schematic views illustrating an exemplary example of another overall operation of the resource selection system shown in FIG. 1 according to one or more embodiments of the present invention. FIGS. 5A~5B are schematic views illustrating an exemplary example of yet another overall operation of the resource selection system shown in FIG. 1 according to one or more embodiments of the present invention. FIGS. 6A~6B are schematic views illustrating an exemplary example of still another overall operation of the resource selection system shown in FIG. 1 according to one or more embodiments of the present invention.

As shown in FIGS. 3A~3B, the base station 11 has coverage 10, and the UE 13 moves from the outside of the coverage 10 of the UE 13 towards the inside of the coverage 10. Firstly, when the UE 13 is located at a location L1 (i.e., outside the coverage 10), a current state of the UE 13 is the out-of-coverage state 22. In this case, the base station 11 is unable to allocate any resource to the UE 13. Accordingly, the resource selection device 131 may select a predetermined D2D communication resource (e.g., Mode 2 UICC described in the priority basis application) as the corresponding D2D communication resource 4, and the UE 13 may perform a D2D communication 61 with the UE 15 via the transceiver device 133 according to the predetermined D2D communication resource.

As the UE 13 moves from the location L1 towards a location L2, the resource selection device 131 may determine whether the condition C1 is satisfied according to the state machine model 2 (including the state machine models 2a~2c). If the condition C1 is satisfied, then the resource selection device 131 may determine that a current state of the UE 13 has transferred from the out-of-coverage state 22 to the idle initial mode 802. If the condition C1 is not satisfied, then the resource selection device 131 may determine that a current state of the UE 13 is still the out-of-coverage state 22. As shown in FIGS. 3A~3B, when the condition C1 is satisfied, the UE 13 is located at the location L2. The idle initial mode 802 is a transition state. In this case, the UE 13 may continue to perform a D2D communication 62 with the UE 15 via the transceiver device 133 according to the predetermined D2D communication resource.

As the UE 13 moves from the location L2 towards a location L3, a current state of the UE 13 gradually transfers from the idle initial mode 802 to the idle transient mode 804 (e.g., when the condition C1 is satisfied). When a current state of the UE 13 becomes the idle transient mode 804, the resource selection device 131 may further determine whether the condition D12 is satisfied. If the condition D12 is satisfied, then the resource selection device 131 may determine that a current state of the UE 13 has transferred from the idle transient mode 804 to the connection transient mode 824. As shown in FIGS. 3A~B, when the condition D12 is satisfied, the UE 13 is located at the location L3. The connection transient mode 824 still belongs to a transition state. In this case, the UE 13 may continue to perform a D2D communication 63 with the UE 15 via the transceiver device 133 according to the predetermined D2D communication resource. If the condition D12 is not satisfied, then the resource selection device 131 may determine that a current state of the UE 13 has transferred from the idle transient mode 804 to the idle steady abnormal mode 8064. In this case, the resource selection device 131 may select a resource instructed by the base station (e.g., the second idle state resource 404) as the corresponding D2D communication resource 4.

As the UE 13 moves from the location L3 towards a location L4, the resource selection device 131 may further determine whether the condition F1 is satisfied. If the condition F1 is satisfied, then the resource selection device 131 may determine that a current state of the UE 13 has transferred from the connection transient mode 824 to the connection steady normal mode 8262. If the condition F1 is not satisfied, the resource selection device 131 may determine that a current state of the UE 13 is still the connection transient mode 824. As shown in FIGS. 3A~3B, when the condition F1 is satisfied, the UE 13 is located at the location L4. In this case, the resource selection device 131 may select a resource instructed by the base station 11 (e.g., the first connection state resource 422 described above) as the corresponding D2D communication resource 4, and the UE 13 may perform a D2D communication 64 with the UE 15 via the transceiver device 133 according to the first connection state resource 422.

As shown in FIGS. 4A~4B, the base station 11 has coverage 10, and the UE 13 moves from the inside of the coverage 10 towards the outside of the coverage 10. Initially, when the UE 13 is located at a location L5 (i.e., when the UE 13 is located within the coverage 10), a current state of the UE 13 is the connection steady normal mode 8262. In this case, the resource selection device 131 may select a resource instructed by the base station 11 (e.g., the first connection state resource 422) as the corresponding D2D communication resource 4, and the UE 13 may perform a D2D communication 65 with the UE 15 via the transceiver device 133 according to the first connection state resource 422.

As the UE 13 moves from the location L5 towards a location L6, the resource selection device 131 may determine whether the condition F2 is satisfied according to the state machine model 2 (including the state machine models 2a~2c). If the condition F2 is satisfied, then the resource selection device 131 may determine that a current state of the UE 13 has transferred from the connection steady normal mode 8262 to the connection steady abnormal mode 8264. If the condition F2 is not satisfied, then the resource selection device 131 may determine that a current state of the UE 13 is still the connection steady normal mode 8262. As shown in FIGS. 4A~4B, when the condition F2 is satisfied, the UE 13 is located at the location L6. In this case, the resource selection device 131 may select a resource instructed by the base station 11 (e.g., the second connection state resource 424 described above) as the corresponding D2D communication resource 4, and the UE 13 may perform a D2D communication 66 with the UE 15 via the transceiver device 133 according to the second connection state resource 424.

As the UE 13 moves from the location L6 towards a location L7, the resource selection device 131 may further sequentially determine whether the condition F3 and the condition D23 are satisfied according to the state machine model 2 (including the state machine models 2a~2c). If both the condition F3 and the condition D23 are satisfied, then the resource selection device 131 may determine that a current state of the UE 13 has transferred from the connection steady abnormal mode 8264 to the connection steady normal mode 8262.

If the condition F3 is satisfied but the condition D23 is not, then the resource selection device 131 may determine that a current state of the UE 13 has transferred from the connection steady abnormal mode 8264 to the connection transient mode 824. If neither of the condition F3 and the condition D23 is satisfied, then the resource selection device 131 may further determine whether the condition D22 is satisfied according to the state machine model 2 (including the state machine models 2a~2c). If the condition D22 is satisfied, then the resource selection device 131 may determine that a current state of the UE 13 has transferred from the connection steady abnormal mode 8264 to the idle steady mode 806 (which may be the idle steady normal mode 8062 or the idle steady abnormal mode 8064). If the condition D22 is not satisfied, then the resource selection device 131 may determine that a current state of the UE 13 is still the connection steady abnormal mode 8264. As shown in FIGS. 4A~4B, when the condition D22 is satisfied, the UE 13 is located at the location L7. In this case, the resource selection device 131 may select a resource instructed by the base station 11 (e.g., the first idle state resource 402 or the second idle state resource 404 described above) as the corresponding D2D communication resource, and the UE 13 may perform a D2D communication 67 with the UE 15 via the transceiver 133 according to the first idle state resource 402 or the second idle state resource 404.

As the UE 13 moves from the location L7 towards a location L8, the resource selection device 131 may further determine whether the condition C2 is satisfied according to the state machine model 2 (including the state machine models 2a~2c). If the condition C2 is not satisfied, then the resource selection device 131 may determine that a current state of the UE 13 has transferred from the idle steady mode 806 to the idle transient mode 804.

If the condition C2 is satisfied, then the resource selection device 131 may determine that a current state of the UE 13 has transferred from the idle steady mode 806 to the out-of-coverage state 22. As shown in FIGS. 4A~4B, when the condition C2 is satisfied, the UE 13 is located at the location L8. In this case, the base station 11 is unable to allocate any resource to the UE 13. Accordingly, the resource selection device 131 may select a predetermined D2D communication resource (e.g., Mode 2 UICC described in the priority basis application) as the corresponding D2D communication resource 4, and the UE 13 may perform a D2D communication 68 with the UE 15 via the transceiver device 133 according to the predetermined D2D communication resource.

As shown in FIGS. 5A~5B, the base station 11a has coverage 10a, and the base station 11b has coverage 10b. In FIGS. 5A~5B, it is assumed that the base station 11a is a base station that can provide the D2D communication resource 4 for the UE 13 but the base station 11b is not. It is also assumed that the base station 11a, the base station 11b and the UE 13 have operation frequencies different from each other; the base station 11a is any kind of National Security and Public Safety (NSPS) base station, and the base station 11b is any kind of commercial base station; additionally, the state machine model 2 created by the resource selection device 131 for the UE 13 comprises the in-coverage state 20 and the out-of-coverage state 22, and the in-coverage state 20 comprises an initial mode 202 (not required), a transient mode 204 (which may be the idle transient mode 804 or the connection transient mode 824) and a steady mode 206 (which may be the idle steady mode 806 or the connection steady mode 826). On these assumptions, when the UE 13 moves from the inside of the coverage 10b (i.e., the location L9) to a location where the coverage 10a and the coverage 10b are overlapped with each other (i.e., the location L10), the UE 13 may make a selection on the D2D communication resource 4 in a multi-carrier system. Possibly, the coverage 10b of the base station 11b is not overlapped with the coverage 10a of the base station 11a. In the latter case, the UE 13 may also make a selection on the D2D communication resource 4 when the UE moves from the coverage 10b to the coverage 10a.

Further speaking, when the UE 13 is located at the location L9 (i.e., the UE 13 is located out of the coverage 10a), a current state of the UE 13 is just the out-of-coverage state 22. In this case, the base station 11a is unable to allocate any resource to the UE 13. Accordingly, the resource selection device 131 may select a predetermined D2D communication resource as the corresponding D2D communication resource 4.

As the UE 13 moves from the location L9 towards the location L10, the resource selection device 131 may determine whether the condition C1 is satisfied according to the state machine model 2. If the condition C1 is satisfied, then the resource selection device 131 may determine that a current state of the UE 13 has transferred from the out-of-coverage state 22 to the initialization mode 202. If the condition C1 is not satisfied, then the resource selection device 131 may determine that a current state of the UE 13 is still the out-of-coverage state 22.

When the condition C1 is satisfied, a current state of the UE 13 may gradually transfer from the initialization mode 202 to the transient mode 204. In FIGS. 5A~5B, the state machine model 2 may also not comprise the initialization mode 202. In the latter case, the resource selection device 131 may directly determine that a current state of the UE 13 has transferred from the out-of-coverage state 22 to the transient mode 204 if the condition C1 is satisfied. When a current state of the UE 13 is the transient mode 204, the resource selection device 131 may further determine whether the condition F1 is satisfied. If the condition F1 is satisfied, then the resource selection device 131 may determine that a current state of the UE 13 has transferred from the transient mode 204 to the steady mode 206. If the condition F2 is not satisfied, the resource selection apparatus 131 may determine that a current state of the UE 13 is still the transient mode 204. When a current state of the UE 13 is any of the initialization mode 202, the transient mode 204 and the steady mode 206, the resource selection device 131 may select a predetermined D2D communication resource or a resource instructed by the base station 11a as the corresponding D2D communication resource 4.

As shown in FIGS. 6A~6B, the base station 11c has coverage 10c, and the base station 11d has coverage 10d. In FIGS. 6A~6B, it is assumed that the base station 11c and the base station 11d are both base stations that can provide the D2D communication resource 4 for the UE 13, and the base station 11c, the base station 11d and the UE 13 have operation frequencies different from each other. In FIGS. 6A~6B, the base station 11c is not located within the coverage of the base station 11d, so the two base stations cannot communicate with each other wirelessly. However, it is also possible that the base station 11c is located within the coverage of the base station 11d, in which case the two base stations can communicate with each other wirelessly. Additionally, it is also assumed that the state machine model 2 created by the resource selection device 131 for the UE 13 comprises the in-coverage state 20 and the out-of-coverage state 22, and the in-coverage state 20 comprises an initial mode 202 (not required), a transient mode 204 (which may be the idle transient mode 804 or the connection transient mode 824) and a steady mode 206 (which may be the idle steady mode 806 or the connection steady mode 826). On these assumptions, when the UE 13 moves from the inside of the coverage 10c (i.e., the location L1) to a location where the coverage 10c and the coverage 10d are overlapped with each other (i.e., the location L12), the UE 13 may offload the D2D communication resource 4.

Further speaking, when the UE 13 is located at the location L11 (i.e., the UE 13 is located within the coverage 10c but out of the coverage 10d), a current state of the UE 13 is just the out-of-coverage state 22 from the perspective of the base station 11d. In this case, the base station 11d is unable to allocate any resource to the UE 13. Accordingly, the resource selection device 131 may select a predetermined D2D communication resource or a resource instructed by the base station 11e as the corresponding D2D communication resource 4.

As the UE 13 moves from the location L9 towards the location L10, the resource selection device 131 may determine whether the condition C1 is satisfied for the base station 11 according to the state machine model 2. If the condition C1 is satisfied for the base station 11, then the resource selection device 131 may determine that a current state of the UE 13 has transferred from the out-of-coverage state 22 to the initialization mode 202. If the condition C1 is not satisfied for the base station 11, then the resource selection device 131 may determine that a current state of the UE 13 is still the out-of-coverage state 22.

When the condition C1 is satisfied, a current state of the UE 13 may gradually transfer from the initialization mode 202 to the transient mode 204. In FIGS. 6A~6B, the state machine model 2 may also not comprise the initialization mode 202. In the latter case, the resource selection device 131 may directly determine that a current state of the UE 13 has transferred from the out-of-coverage state 22 to the transient mode 204 if the condition C1 is satisfied. When a current state of the UE 13 is the transient mode 204, the resource selection device 131 may further determine whether the condition F1 is satisfied. If the condition F1 is satisfied, then the resource selection device 131 may determine that a current state of the UE 13 has transferred from the transient mode 204 to the steady mode 206. If the condition F2 is not satisfied, the resource selection apparatus 131 may determine that a current state of the UE 13 is still the transient mode 204. When a current state of the UE 13 is any of the initialization mode 202, the transient mode 204 and the steady mode 206, the resource selection device 131 may select a predetermined D2D communication resource, a resource instructed by the base station 11c or a resource instructed by the base station 11d as the corresponding D2D communication resource 4.

Figure 7:
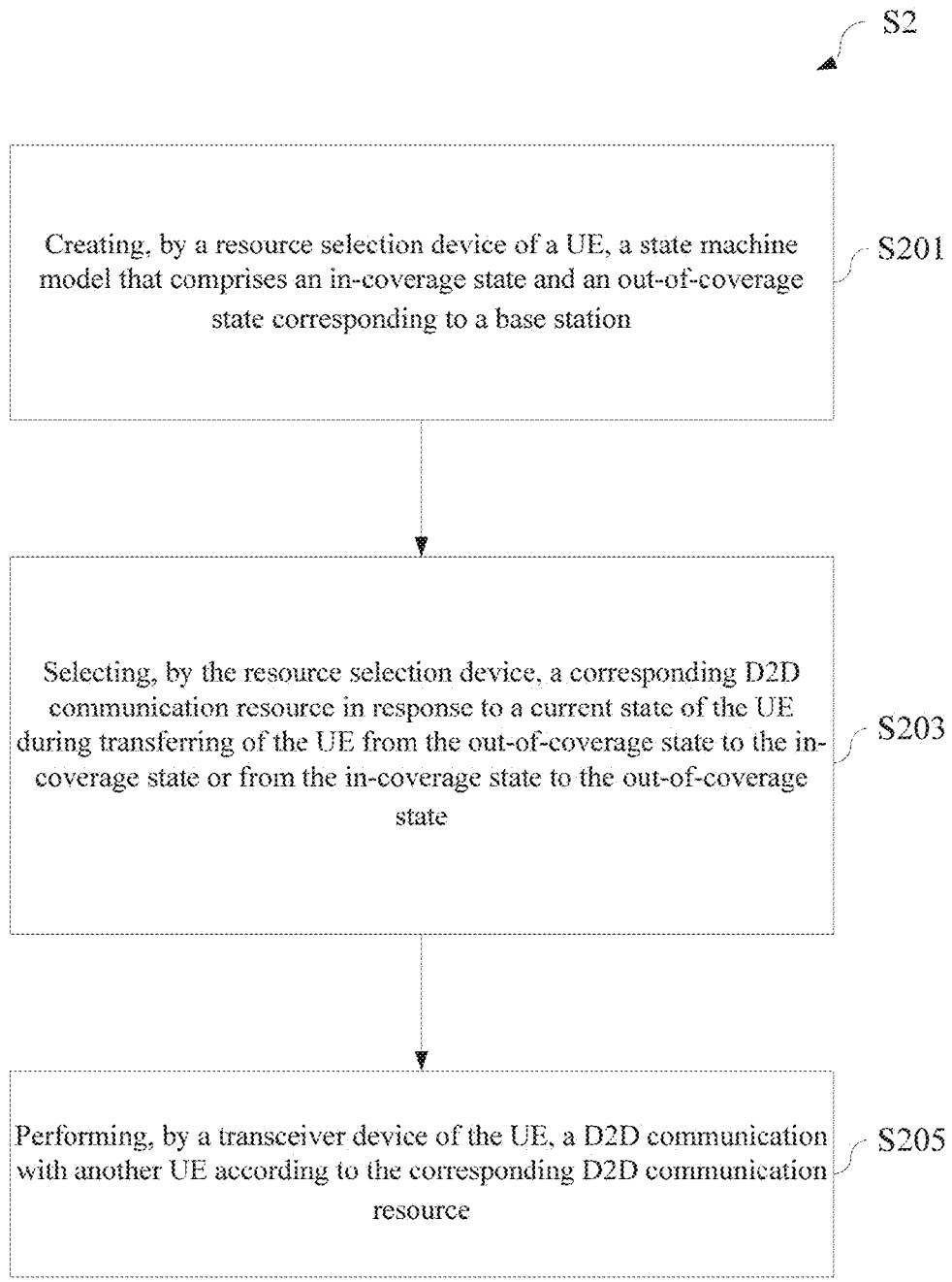
FIG. 7 is a flowchart diagram illustrating an exemplary example of a resource selection method of D2D communications according to one or more embodiments of the present invention.

Another embodiment (called "the second embodiment" hereinafter) of the present invention is a resource selection method of D2D communications. FIG. 7 is a flowchart diagram illustrating an exemplary example of a resource selection method of D2D communications according to one or more embodiments of the present invention. Sequences of all steps described in the second embodiment and exemplary examples thereof can be arbitrarily adjusted without departing from the spirits of the present invention and shall not be construed to limit the scope of the present invention.

As shown in FIG. 7, the resource selection method S2 of D2D communications may comprise the following steps: creating, by a resource selection device of a UE, a state machine model that comprises an in-coverage state and an out-of-coverage state corresponding to a base station (step S201); selecting, by the resource selection device, a corresponding D2D communication resource in response to a current state of the UE during transferring of the UE from the out-of-coverage state to the in-coverage state or from the in-coverage state to the out-of-coverage state (step S203); and performing, by a transceiver device of the UE, a D2D communication with another UE according to the corresponding D2D communication resource (step S205). The resource selection method S2 of D2D communications may be substantially applied to the UE 13 described in the first embodiment, so the UE described in the second embodiment may be the UE 13 described in the first embodiment and the resource selection device and the transceiver device described in the second embodiment may be the resource selection device 131 and the transceiver device 133 described in the first embodiment respectively.

As an exemplary example of the second embodiment, the resource selection method S2 of D2D communications may further comprise the following steps of: determining, by the resource selection device, that the current state of the UE is the in-coverage state if a first condition is satisfied; and determining, by the resource selection device, that the current state of the UE is the out-of-coverage state if a second condition is satisfied.

As an exemplary example of the second embodiment, the resource selection method S2 of D2D communications may further comprise the following steps of: determining, by the resource selection device, that the current state of the UE is the in-coverage state if a first condition is satisfied; and determining, by the resource selection device, that the current state of the UE is the out-of-coverage state if a second condition is satisfied. Besides, the first condition is that the UE complies with a cell selection criterion and a system information block (SIB) is decoded by the UE, and the second condition is that the UE does not comply with the cell selection criterion.

As an exemplary example of the second embodiment, in the resource selection method S2 of D2D communications, the in-coverage state may further comprise a radio resource control (RRC) idle state and an RRC connection state. Besides, the step S203 may further comprise the following steps of: selecting, by the resource selection device, an idle state resource as the corresponding D2D communication resource in response to that the current state of the UE is the RRC idle state; and selecting, by the resource selection device, a connection state resource as the corresponding D2D communication resource in response to that the current state of the UE is the RRC connection state.

As an exemplary example of the second embodiment, in the resource selection method S2 of D2D communications, the in-coverage state may further comprise a radio resource control (RRC) idle state and an RRC connection state, the RRC idle state may further comprise an idle initial mode, an idle transient mode and an idle steady mode, and the RRC connection state may further comprise a connection transient mode and a connection steady mode. Besides, the step S203 may further comprise the following steps of: selecting, by the resource selection device, an idle state resource as the corresponding D2D communication resource in response to that the current state of the UE is the RRC idle state; selecting, by the resource selection device, a connection state resource as the corresponding D2D communication resource in response to that the current state of the UE is the RRC connection state; selecting, by the resource selection device, the idle state resource as the corresponding D2D communication resource in response to that the current state of the UE is the idle steady mode; not selecting, by the resource selection device, the idle state resource as the corresponding D2D communication resource in response to that the current state of the UE is the idle initial mode or the idle transient mode; selecting, by the resource selection device, the connection state resource as the corresponding D2D communication resource in response to that the current state of the UE is the connection steady mode; and not selecting, by the resource selection device, the connection state resource as the corresponding D2D communication resource in response to that the current state of the UE is the connection transient mode.

As an exemplary example of the second embodiment, in the resource selection method S2 of D2D communications, the in-coverage state may further comprise an RRC idle state and an RRC connection state, the RRC idle state may further comprise an idle initial mode, an idle transient mode and an idle steady mode, the RRC connection state may further comprise a connection transient mode and a connection steady mode, the idle steady mode may further comprise an idle steady normal mode and an idle steady abnormal mode, the connection steady mode may further comprise a connection steady normal mode and a connection steady abnormal mode, the idle state resource may further comprise a first idle state resource and a second idle state resource, and the connection state resource may further comprise a first connection state resource and a second connection state resource. Besides, the step S203 may further comprise the following steps of: selecting, by the resource selection device, an idle state resource as the corresponding D2D communication resource in response to that the current state of the UE is the RRC idle state; selecting, by the resource selection device, a connection state resource as the corresponding D2D communication resource in response to that the current state of the UE is the RRC connection state; selecting, by the resource selection device, the idle state resource as the corresponding D2D communication resource in response to that the current state of the UE is the idle steady mode; not selecting, by the resource selection device, the idle state resource as the corresponding D2D communication resource in response to that the current state of the UE is the idle initial mode or the idle transient mode; selecting, by the resource selection device, the connection state resource as the corresponding D2D communication resource in response to that the current state of the UE is the connection steady mode; and not selecting, by the resource selection device, the connection state resource as the corresponding D2D communication resource in response to that the current state of the UE is the connection transient mode; selecting, by the resource selection device, the first idle state resource as the corresponding D2D communication resource in response to that the current state of the UE is the idle steady normal mode; selecting, by the resource selection device, the second idle state resource as the corresponding D2D communication resource in response to that the current state of the UE is the idle steady abnormal mode; selecting, by the resource selection device, the first connection state resource as the corresponding D2D communication resource in response to that the current state of the UE is the connection steady normal mode; and selecting, by the resource selection device, the second connection state resource as the corresponding D2D communication resource in response to that the current state of the UE is the connection steady abnormal mode.

As an exemplary example of the second embodiment, the step S203 may further comprise the following step of: selecting, by the resource selection device, a predetermined D2D communication resource as the corresponding D2D communication resource in response to that the current state of the UE is the out-of-coverage state.

The resource selection method S2 of D2D communications substantially comprises steps corresponding to all operations of the UE 13. Because all the corresponding steps comprised in the resource selection method S2 can be readily known by those of ordinary skill in the art from the descriptions of the UE 13, these corresponding steps will not be further described herein.

In the present invention, a UE may create a state machine model and select a corresponding D2D communication resource in response to a current state of the UE. The state machine model may comprise various states (e.g., an in-coverage state and an out-of-coverage state corresponding to any base station, as well as other detailed states comprised therein respectively), and each of the states may correspond to an appropriate D2D communication resource. Especially, the UE can select an appropriate D2D communication resource in response to a current state of the UE at any time during transferring of the UE from the out-of-coverage state to the in-coverage state or from the in-coverage state to the out-of-coverage state.

Based on the aforesaid operations, when a UE that is to perform a D2D communication is located within the coverage of a same base station as another UE (i.e., a current state of the UE), the UE may select a wireless communication resource that will not cause interferences between respective communications of the UEs to perform the D2D communication. When a UE that is to perform a D2D communication enters into the coverage of a base station (i.e., another current state of the UE), the UE may select an appropriate wireless communication resource to perform the D2D communication. The appropriate wireless communication resource may be provided actively by the base station, or be requested by the UE from the base station. When a UE that is to perform a D2D communication leaves the coverage of a base station (i.e., yet another current state of the UE), the UE may release the wireless communication resource that is originally occupied by the UE, and select another wireless communication resource suitable for its current state to perform the D2D communication. Thereby, the present invention indeed provides an effective resource selection mechanism for the new D2D communication scheme.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A user equipment (UE) of device-to-device (D2D) communications, comprising:
 a resource selection device, being configured to create a state machine model that comprises an in-coverage state and an out-of-coverage state corresponding to a base station, and configured to select a corresponding D2D communication resource in response to a current state of the UE during transferring of the UE from the out-of-coverage state to the in-coverage state or from the in-coverage state to the out-of-coverage state; and
 a transceiver device, being configured to perform a D2D communication with another UE according to the corresponding D2D communication resource; wherein:
 the in-coverage state further comprises a radio resource control (RRC) idle state and an RRC connection state;
 the resource selection device selects an idle state resource as the corresponding D2D communication resource in response to that the current state of the UE is the RRC idle state;
 the resource selection device selects a connection state resource as the corresponding D2D communication resource in response to that the current state of the UE is the RRC connection state;
 the RRC idle state comprises an idle initial mode, an idle transient mode and an idle steady mode, and the RRC connection state comprises a connection transient mode and a connection steady mode;
 the resource selection device selects the idle state resource as the corresponding D2D communication resource in response to that the current state of the UE is the idle steady mode;
 the resource selection device does not select the idle state resource as the corresponding D2D communication resource in response to that the current state of the UE is the idle initial mode or the idle transient mode;
 the resource selection device selects the connection state resource as the corresponding D2D communication resource in response to that the current state of the UE is the connection steady mode; and
 the resource selection device does not select the connection state resource as the corresponding D2D communication resource in response to that the current state of the UE is the connection transient mode.

2. The UE of claim 1, wherein:
 if a first condition is satisfied, the resource selection device determines that the current state of the UE is the in-coverage state; and
 if a second condition is satisfied, the resource selection device determines that the current state of the UE is the out-of-coverage state.

3. The UE of claim 2, wherein the first condition is that the UE complies with a cell selection criterion and a system information block (SIB) is decoded by the UE, and the second condition is that the UE does not comply with the cell selection criterion.

4. The UE of claim 1, wherein:
 the idle steady mode comprises an idle steady normal mode and an idle steady abnormal mode, and the connection steady mode comprises a connection steady normal mode and a connection steady abnormal mode;
 the idle state resource comprises a first idle state resource and a second idle state resource, and the connection state resource comprises a first connection state resource and a second connection state resource;
 the resource selection device selects the first idle state resource as the corresponding D2D communication resource in response to that the current state of the UE is the idle steady normal mode;
 the resource selection device selects the second idle state resource as the corresponding D2D communication resource in response to that the current state of the UE is the idle steady abnormal mode;
 the resource selection device selects the first connection state resource as the corresponding D2D communication resource in response to that the current state of the UE is the connection steady normal mode; and
 the resource selection device selects the second connection state resource as the corresponding D2D communication resource in response to that the current state of the UE is the connection steady abnormal mode.

5. A resource selection method of device-to-device (D2D) communications for a user equipment (UE), the UE comprising a resource selection device and a transceiver device, the resource selection method comprising:
 creating, by the resource selection device, a state machine model that comprises an in-coverage state and an out-of-coverage state corresponding to a base station;
 selecting, by the resource selection device, a corresponding D2D communication resource in response to a current state of the UE during transferring of the UE from the out-of-coverage state to the in-coverage state or from the in-coverage state to the out-of-coverage state; and
 performing, by the transceiver device, a D2D communication with another UE according to the corresponding D2D communication resource; wherein
 the in-coverage state further comprises a radio resource control (RRC) idle state and an RRC connection state;
 the step of selecting the corresponding D2D communication resource comprises the following steps of:
  selecting, by the resource selection device, an idle state resource as the corresponding D2D communication resource in response to that the current state of the UE is the RRC idle state; and
  selecting, by the resource selection device, a connection state resource as the corresponding D2D communication resource in response to that the current state of the UE is the RRC connection state;

the RRC idle state comprises an idle initial mode, an idle transient mode and an idle steady mode, and the RRC connection state comprises a connection transient mode and a connection steady mode; and the step of selecting the corresponding D2D communication resource comprises the following steps of:

selecting, by the resource selection device, the idle state resource as the corresponding D2D communication resource in response to that the current state of the UE is the idle steady mode;

not selecting, by the resource selection device, the idle state resource as the corresponding D2D communication resource in response to that the current state of the UE is the idle initial mode or the idle transient mode;

selecting, by the resource selection device, the connection state resource as the corresponding D2D communication resource in response to that the current state of the UE is the connection steady mode; and not selecting, by the resource selection device, the connection state resource as the corresponding D2D communication resource in response to that the current state of the UE is the connection transient mode.

6. The resource selection method of claim 5, further comprising the following steps of:

determining, by the resource selection device, that the current state of the UE is the in-coverage state if a first condition is satisfied; and determining, by the resource selection device, that the current state of the UE is the out-of-coverage state if a second condition is satisfied.

7. The resource selection method of claim 6, wherein the first condition is that the UE complies with a cell selection criterion and a system information block (SIB) is decoded by the UE, and the second condition is that the UE does not comply with the cell selection criterion.

8. The resource selection method of claim 5, wherein:

the idle steady mode comprises an idle steady normal mode and an idle steady abnormal mode, and the connection steady mode comprises a connection steady normal mode and a connection steady abnormal mode;

the idle state resource comprises a first idle state resource and a second idle state resource, and the connection state resource comprises a first connection state resource and a second connection state resource; and the step of selecting the corresponding D2D communication resource comprises the following steps of:

selecting, by the resource selection device, the first idle state resource as the corresponding D2D communication resource in response to that the current state of the UE is the idle steady normal mode;

selecting, by the resource selection device, the second idle state resource as the corresponding D2D communication resource in response to that the current state of the UE is the idle steady abnormal mode;

selecting, by the resource selection device, the first connection state resource as the corresponding D2D communication resource in response to that the current state of the UE is the connection steady normal mode; and selecting, by the resource selection device, the second connection state resource as the corresponding D2D communication resource in response to that the current state of the UE is the connection steady abnormal mode.

9. The UE of claim 1, wherein:

the resource selection device selects a predetermined D2D communication resource as the corresponding D2D communication resource in response to that the current state of the UE is the out-of-coverage state.

10. The resource selection method of claim 5, wherein the step of selecting the corresponding D2D communication resource comprises the following step of:

selecting, by the resource selection device, a predetermined D2D communication resource as the corresponding D2D communication resource in response to that the current state of the UE is the out-of-coverage state.

* * * * *